(12) United States Patent
Sone et al.

(10) Patent No.: US 7,443,504 B2
(45) Date of Patent: Oct. 28, 2008

(54) ARBITRARY AND ENDLESS POLARIZATION CONTROLLER AND POLARIZATION-MODE DISPERSION COMPENSATOR USING THE SAME AND ARBITRARY AND ENDLESS POLARIZATION CONTROLLING METHOD

(75) Inventors: Kyosuke Sone, Kawasaki (JP); Setsuo Yoshida, Yokohama (JP); Hideyuki Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 11/079,224

(22) Filed: Mar. 15, 2005

(65) Prior Publication Data

US 2005/0162741 A1    Jul. 28, 2005

Related U.S. Application Data

(63) Continuation of application No. PCT/JP03/03246, filed on Mar. 18, 2003.

(51) Int. Cl.
    *G01J 4/00*    (2006.01)
(52) U.S. Cl. ..................................... 356/365
(58) Field of Classification Search .................. None
    See application file for complete search history.

(56) References Cited

U.S. PATENT DOCUMENTS

| 4,958,918 | A | 9/1990 | Walker | 350/378 |
| 6,373,614 | B1* | 4/2002 | Miller | 359/237 |
| 6,576,886 | B1* | 6/2003 | Yao | 356/368 |
| 6,603,112 | B1* | 8/2003 | Medard et al. | 250/227.11 |
| 6,765,723 | B1* | 7/2004 | Savory | 359/499 |
| 6,859,268 | B2* | 2/2005 | Chou et al. | 356/73.1 |
| 7,067,795 | B1* | 6/2006 | Yan et al. | 250/225 |
| 7,106,443 | B2* | 9/2006 | Wein et al. | 356/364 |
| 7,139,476 | B2* | 11/2006 | Patel et al. | 398/16 |
| 7,202,950 | B2* | 4/2007 | Shribak et al. | 356/364 |

FOREIGN PATENT DOCUMENTS

| JP | 63-118709 | 5/1988 |
| JP | 63-313120 | 12/1988 |
| JP | 2000-330079 | 11/2000 |
| JP | 2001-324627 | 11/2001 |

OTHER PUBLICATIONS

F. Heismann, et al., "Fast Automatic Polarization Control System", IEEE Photonics Technology Letters, vol. 4, No. 5, pp. 503-505, May 1992.

* cited by examiner

*Primary Examiner*—Gregory J. Toatley, Jr.
*Assistant Examiner*—Juan D Valentin
(74) *Attorney, Agent, or Firm*—Staas & Halsey LLP

(57) ABSTRACT

A polarization controller is configured to comprise polarization state monitoring section for monitoring polarization states of input light and output light of a variable polarization light element; and a control section, when the positions on a Poincare sphere expressing each of the polarization states monitored by the polarization state monitoring section are at the positions being symmetric or approximately symmetric for the equator of the Poincare sphere, for rotating the Poincare sphere by $\pi$ by using the earth axis of the Poincare sphere as a rotation axis by changing the azimuth of the optical axis of the variable polarization light element, and also for inverting the changing direction of the phase shift amount. By this, arbitrary and endless control of polarization light can be realized by a phase shift amount being less than the wavelength $\lambda$ of the input light.

16 Claims, 19 Drawing Sheets

POLARIZATION CONTROLLER

ARBITRARY AND ENDLESS POLARIZATION CONTROLLER AND POLARIZATION-MODE DISPERSION COMPENSATOR USING THE SAME AND ARBITRARY AND ENDLESS POLARIZATION CONTROLLING METHOD

CROSS REFERENCE TO RELATED APPLICATIONS

This application is based on and hereby claims priority to International Application No. PCT/JP2003/003246 filed on Mar. 18, 2003 in Japan, the contents of which are hereby incorporated by reference.

BACKGROUND OF THE INVENTION (1) Field of the Invention

The present invention relates to an arbitrary and limitless polarization controller, a polarization-mode dispersion compensator using the same, and an arbitrary and limitless polarization controlling method, which are used in optical communication and the like.

(2) Description of Related Art

A polarization controller can freely change a polarization state of incident light from an arbitrary state to another arbitrary state. As it is well known, the polarization state of light can be expressed by Stokes parameters $S_0$ (polarization intensity), $S_1$ (horizontal linear polarization (TE) component), $S_2$ (oblique 45° direction linear polarization component), and $S_3$ (clockwise circular polarization component). At complete polarization, that is, at a DOP (degree of polarization)=1, the following equation is established.

$$S_0^2 = S_1^2 + S_2^2 + S_3^2$$

Therefore, each of the Stokes parameters $S_1$, $S_2$, and $S_3$ expressing the polarization states are positioned at a point on a sphere whose radius is the intensity $S_0$. If only the polarization state is focused on, by considering light of the unit intensity ($S_0=1$), the polarization state can be expressed by one point on a unit sphere in which the $S_1$, $S_2$, and $S_3$ are respective three axes in an orthogonal coordinate system (refer to FIG. 18). This is "Poincare sphere".

If the Poincare sphere shown in FIG. 18 were regarded to be a terrestrial globe, the equator 110 shows linear polarization, the geographical north pole NP shows clockwise circular polarization, and the geographical south pole SP shows counter-clockwise circular polarization. In addition, the point A shows horizontal linear polarization (TE mode), the point B shows vertical linear polarization (TM mode), and the point C shows oblique 45° direction linear polarization. Further, polarization anywhere besides on the equator 110, the geographical north pole NP, and the geographical south pole SP shows ellipse polarization.

That is, in order for the polarization controller to change the polarization state of incident light freely from an arbitrary state to another arbitrary state, it is necessary that an arbitrary point can be changed (converted) freely to another arbitrary point on the Poincare sphere.

In one method, an electro-optical effect was used to realize a polarization controller. The method used a variable polarization light element (hereinafter, in some cases, simply referred to as an element). In the variable polarization light element, wave plate elements arrayed in plural stages could freely rotate the azimuth (angle for the vibration direction of the incident light) of the optical axis while the phase shift amount was kept constant. Especially, it is known that a polarization controller having the arbitrary and limitless property of a three stage structure can be realized by using three elements: a quarter-wave plate, a half-wave plate, and a quarter-wave plate, whose optical axes can be freely rotated.

In Japanese Patent Laid-Open (Kokai) SHO 63-118709, a polarization controller provides (1) a first ellipticity conversion element that can change (rotate) a point on the Poincare sphere around the $S_1$ axis or the $S_2$ axis by the angle of ellipticity control amount $\delta\phi_1$ corresponding to a control voltage $V_1$ (or a control current $I_1$). The polarization controller of SHO 63-118709 also provides (2) a phase shifter element that can change (rotate) a point on the Poincare sphere corresponding to the polarization state of light from the first ellipticity conversion element around the $S_2$ axis by the angle of phase control amount $\delta\phi_2$ corresponding to a control voltage $V_2$ (or a control current $I_2$). Finally, the polarization controller of SHO 63-118709 provides (3) a second ellipticity conversion element that can change (rotate) a point on the Poincare sphere corresponding to the polarization state of light from the phase shifter element around the $S_1$ axis or the $S_3$ axis by the angle of ellipticity control amount $\delta\phi_3$ corresponding to a control voltage $V_3$ (or a control current $I_3$).

According to the polarization controller of SHO 63-118709, although the above-mentioned ellipticity control amount $\delta\phi_1$ is limited to a range "0 to π", the phase control amount $\delta\phi_2$ is limited to a range "–π to π", and the ellipticity control amount $\delta\phi_3$ is limited to a range "–π to 0", a polarization state expressed by an arbitrary point on the Poincare sphere can be continuously changed (converted) to another polarization state expressed by another arbitrary point. In particular, a polarization state expressed by an arbitrary point on the Poincare sphere can be continuously changed to another polarization state by properly controlling the $\delta\phi_1$, $\delta\phi_2$, and $\delta\phi_3$, that is, by properly controlling the control voltages $V_1$, $V_2$, and $V_3$ (or the control currents $I_1$, $I_2$, and $I_3$).

In addition, as another aspect of the polarization controller of SHO 63-118709, if an element, which can freely change the azimuth in "0 to π/2" by rotating the optical axis and at the same time can freely change the phase shift amount in "0 to λ" (λ shows a wavelength of input light), were used, a polarization controller of one stage structure could be realized. This principle can be considered, for example, in a Poincare sphere expression shown in FIG. 19. That is, in the Poincare sphere expression, if the phase shift amount (phase shift between TE component and TM component) were changed by making the element function as a phase element whose azimuth of optical axis is 0°, the point S on the Poincare sphere 100 could be changed (rotated) to the point S' corresponding to the phase shift amount (refer to the alternate long and short dash line arrow 101). Moreover, by using the $S_1$ axis as the rotation axis, when the phase shift amount becomes λ, the point S can be exactly traveled around (returned to the original polarization state). In this way, if the phase shift amount were changed by making the element function as a phase element whose azimuth of optical axis is 45°, a point on the Poincare sphere 100 can be changed (rotated) corresponding to the phase shift amount by using the $S_2$ axis as the rotation axis.

On the other hand, if the azimuth were changed by rotating the optical axis of the element, the above-mentioned rotation axis ($S_1$ axis or $S_2$ axis) on the Poincare sphere 100 would rotate along the equator [that is, by making the earth axis ($S_3$ axis) of the Poincare sphere its center] (refer to the alternate long and short dash line arrow 102). Therefore, the azimuth of the optical axis of the element would change so that a circle 103 drawn so that the rotation axis of the Poincare sphere is made a center passes through the two points of the input polarization state and the output polarization state. Moreover, if a phase shift amount which only changes between the two points were given, an arbitrary polarization state could be converted to another arbitrary polarization state.

In order for a polarization controller to have an arbitrary and limitless property, as mentioned above, the ranges in which the rotation of the optical axis of the element and the phase shift amount of the element are changed must not have limitations. Since, however, the phase shift amount is generally changed by applying a voltage (or a current), there is a limitation. In order to solve this, it is necessary for the change of the phase shift amount to be switched in an inverse direction by rotating the rotation axis on the Poincare sphere by π. If this switching were executed at the time when the phase shift amount became λ, the rotation axis on the Poincare sphere could be rotated without changing the polarization state, consequently, the arbitrary and limitless control could be realized.

As mentioned above, at the polarization controller of a one state structure, the number of stages is small, therefore, the number of electrodes to be controlled can be reduced. However, if arbitrary and limitless control were to be realized in such a polarization controller, using the above-mentioned technology, the phase shift amount is required to be λ in order to switch the rotation axis on the Poincare sphere in any case. Consequently, in order to further reduce the power consumption, it is necessary to make the phase shift amount small.

An optical polarization control element which can be driven by a low voltage is disclosed by Japanese Patent No. 2646558. In the optical polarization control element described in Japanese Patent No. 2646558, a thin film is formed on the surface of an electro-optical crystal substrate in which an optical waveguide is formed. The thin film is of lower dielectric constant than that of the substrate. Electrodes are formed on the thin film and on the back of the substrate, making low voltage driving possible. In addition, Japanese Patent Laid-Open (Kokai) 2001-324627, describes a polarization controller which is applied to an optical receiver and wavelength dispersion of received light signals is compensated.

The present invention is created by considering the above-mentioned problem, and an object of the present invention is to realize arbitrary and limitless control of polarization by a phase shift amount of less than the wavelength λ of input light.

SUMMARY OF THE INVENTION

In order to achieve the above-mentioned object, an arbitrary and limitless polarization controller of the present invention is a polarization controller, which controls polarization states of light inputted to a variable polarization light element by changing the azimuth of the optical axis and the phase shift amount of the variable polarization light element. The arbitrary and limitless polarization controller is characterized to comprise polarization state monitoring means for monitoring polarization states of input light and output light of the variable polarization light element; and a control means, when the positions on a Poincare sphere expressing each of the polarization states monitored by the polarization state monitoring means are at the positions being symmetric or approximately symmetric for the equator of the Poincare sphere, for rotating the Poincare sphere by π by using the earth axis of the Poincare sphere as a rotation axis by changing the azimuth of the optical axis, and also for inverting the changing direction of the phase shift amount.

In this, the control means can be configured to repeat the rotation of the Poincare sphere and the inversion of the changing direction of the phase shift amount at each time when that each of the polarization states is at one of the symmetric positions is detected.

In addition, the polarization state monitoring means is preferably configured to comprise an input light measuring instrument for measuring the received light amount of the input light separately in each of components in the directions of three axes of the Poincare sphere; and an output light measuring instrument for measuring the received light amount of the output light separately in each of components in the directions of the three axes of the Poincare sphere. And the control means is preferably configured to comprise a symmetric position detecting section for detecting that each of the polarization states is at one of the symmetric positions by detecting that the received light amount measured at the input light measuring instrument and the received light amount measured at the output light measuring instrument are equal or approximately equal in each of the components.

In this, the input light measuring instrument is preferably configured to comprise a first input light receiving element for receiving the input light via a first input light polarizing plate; a second input light receiving element for receiving the input light via a second input light polarizing plate whose azimuth of the optical axis is different from that of the first input light polarizing plate by 45°; and a third input light receiving element for receiving the input light via a first quarter-wave plate whose azimuth of the optical axis is 0° or 90° and a third input light polarizing plate whose azimuth of the optical axis is different from that of the first quarter-wave plate by 45° or 135°.

On the other hand, the output light measuring instrument is preferably configured to comprise a first output light receiving element for receiving the output light via a first output light polarizing plate; a second output light receiving element for receiving the output light via a second output light polarizing plate whose azimuth of the optical axis is different from that of the first output light polarizing plate by 45°; and a third output light receiving element for receiving the output light via a second quarter-wave plate whose azimuth of the optical axis is 0° or 90° and a third output light polarizing plate whose azimuth of the optical axis is different from that of the second quarter-wave plate by 45° or 135°.

In this, in case that the above-mentioned input light measuring instrument has the above-mentioned configuration, the output light measuring instrument is more preferably configured to comprise a third output light receiving element for receiving the output light via a second quarter-wave plate whose azimuth of the optical axis is equal to or different from that of the first quarter-wave plate by 90° and a third output light polarizing plate whose azimuth of the optical axis is different from that of the third input polarizing plate by 90° in the case where the azimuths of the optical axes of the second quarter-wave plate and the first quarter-wave plate are equal, and whose azimuth of the optical axis is equal to that of the third input light polarizing plate in the case where the azimuths of the optical axes are different by 90°.

Further, the control means can comprise a phase shift monitoring section for monitoring the changing direction of the phase shift amount; and an optical axis control section for executing rotation control of the Poincare sphere, when at least the change of the phase shift amount right after each of the polarization states became one of the symmetric positions is observed as the same direction of the change right before at the phase shift monitoring section, and for not executing the rotation control when the inverse direction is observed.

In addition, the phase shift monitoring section can be configured as a voltage value monitoring section for monitoring the change of the voltage value which changes the phase shift amount applied to the variable polarization light element.

Next, a polarization-mode dispersion compensator using an arbitrary and limitless polarization controller of the present invention is a polarization-mode dispersion compensator, which compensates polarization-mode dispersion by using a polarization controller which controls polarization states of light inputted to a variable polarization light element by changing the azimuth of the optical axis and the phase shift amount of the variable polarization light element, is characterized to comprise the following elements:

(1) polarization state monitoring means for monitoring polarization states of input light and output light of the variable polarization light element;
(2) a differential group delay generator for giving a differential group delay to the output light of the variable polarization light element;
(3) a degree of polarization measuring instrument for measuring the degree of polarization of the output light of the differential group delay generator; and
(4) a control means for controlling the azimuth and the phase shift amount so that the degree of polarization measured at the degree of polarization measuring instrument becomes the maximum value, and also for rotating the Poincare sphere by π by using the earth axis of the Poincare sphere as a rotation axis and for inverting the changing direction of the phase shift amount when the positions on the Poincare sphere expressing each of the polarization states monitored by the polarization state monitoring means are at a symmetric position or an approximately symmetric position for the equator of the Poincare sphere.

And also, a polarization-mode dispersion compensator using an arbitrary and limitless polarization controller of the present invention is a polarization-mode dispersion compensator, which compensates polarization-mode dispersion by using a polarization controller which controls polarization states of light inputted to a variable polarization light element by changing the azimuth of the optical axis and the phase shift amount of the variable polarization light element, is characterized to comprise the following elements:

(1) a differential group delay generator for giving a differential group delay to output light of the variable polarization light element;
(2) a degree of polarization measuring instrument for measuring the degree of polarization of the output light of the differential group delay generator; and
(3) a control means, when the degree of polarization measured by the degree of polarization measuring instrument is kept even if a minute amount change of the phase shift amount and a minute amount rotation of the azimuth of the variable polarization light element are repeated, for judging that the positions on a Poincare sphere expressing each of the polarization states of the input light and the output light of the variable polarization light element are at a symmetric position or an approximately symmetric position for the equator of the Poincare sphere, and for rotating the Poincare sphere by π by using the earth axis of the Poincare sphere as a rotation axis by rotating the azimuth of the variable polarization light element and for inverting the changing direction of the phase shift amount.

Further, an arbitrary and limitless polarization controlling method of the present invention, at a polarization controller which controls polarization states of light inputted to a variable polarization light element by changing the azimuth of the optical axis and the phase shift amount of the variable polarization light element, is characterized to comprise the steps of monitoring each of the polarization states of input light and output light of the variable polarization light element; and rotating a Poincare sphere by π by using the earth axis of the Poincare sphere as a rotation axis by rotating the azimuth of the variable polarization light element, and inverting the changing direction of the phase shift amount, when the positions on the Poincare sphere expressing each of the polarization states are at the positions being symmetric or approximately symmetric for the equator of the Poincare sphere.

In this, the arbitrary and limitless polarization controlling method of the present invention can further comprise the step of repeating the rotation of the Poincare sphere and the inversion of the changing direction of the phase shift amount at each time when that each of the polarization states is at one of the symmetric positions is detected.

And an arbitrary and limitless light controlling method of the present invention, at a polarization controller which controls light states of light inputted to a variable polarization light element by changing the azimuth of the optical axis and the phase shift amount of the variable polarization light element, is characterized to comprise the steps of measuring the degree of polarization of output light of the variable polarization light element by a degree of polarization measuring instrument; and controlling a differential group delay generator for giving a differential group delay to the output light of the variable polarization light element so that the degree of polarization measured at the degree of polarization measuring instrument becomes the maximum value, rotating a Poincare sphere by π by using the earth axis of the Poincare sphere as a rotation axis by rotating the azimuth of the variable polarization light element and inverting the changing direction of the phase shift amount when the positions on the Poincare sphere expressing each of the polarization states of the input light and the output light of the variable polarization light element are at a symmetric position or an approximately symmetric position for the equator of the Poincare sphere.

Further, an arbitrary and limitless polarization controlling method of the present invention, at a polarization-mode dispersion compensator, which compensates polarization-mode dispersion by using a polarization controller that controls polarization states of light inputted to a variable polarization light element by changing the azimuth of the optical axis and the phase shift amount of the variable polarization light element, is characterized to comprise the steps of measuring the degree of polarization of output light of the variable polarization light element by a degree of polarization measuring instrument; and judging that the positions on a Poincare sphere expressing each of the polarization states of the input light and the output light of the variable polarization light element are at a symmetric position or an approximately symmetric position for the equator of the Poincare sphere, when the degree of polarization measured by the degree of polarization measuring instrument is kept even if a minute amount change of the phase shift amount and a minute amount rotation of the azimuth of the variable polarization light element are repeated, and rotating the Poincare sphere by π by using the earth axis of the Poincare sphere as a rotation axis by rotating the azimuth of the variable polarization light element, and inverting the changing direction of the phase shift amount.

BRIEF DESCRIPTION OF THE DRAWINGS

FIGS. 2A to 7A are diagrams showing a locus of a change of a polarization state corresponding to a phase shift amount on the Poincare sphere for explaining the principle of the present invention;

FIGS. 2B to 7B are diagrams showing a rotation along the equator of the rotation axis relating to a phase shift on the Poincare sphere for explaining the principle of the present invention;

DESCRIPTION OF THE PREFERRED EMBODIMENTS

[A] Explanation of Principle

First, the principle of the present invention is explained.

At a polarization controller of one stage structure, it is important to switch (invert) the changing direction of the phase shift amount for realizing arbitrary and limitless control. However, when the rotation axis on a Poincare sphere is rotated by $\pi$ at points except that the phase shift amount is $\lambda$ (wavelength of input light), the output polarization state is changed. Therefore, conventionally, as mentioned above, when the phase shift amount became $\lambda$, the rotation axis ($S_1$ axis or $S_2$ axis) with respect to the phase shift on the Poincare sphere is rotated by $\pi$ [that is, the Poincare sphere is rotated by $\pi$ by using the earth axis ($S_3$ axis) of the Poincare sphere as its rotation axis], by changing the azimuth (angle for the vibration direction of the incident light) of the optical axis of the element.

Figure 1:
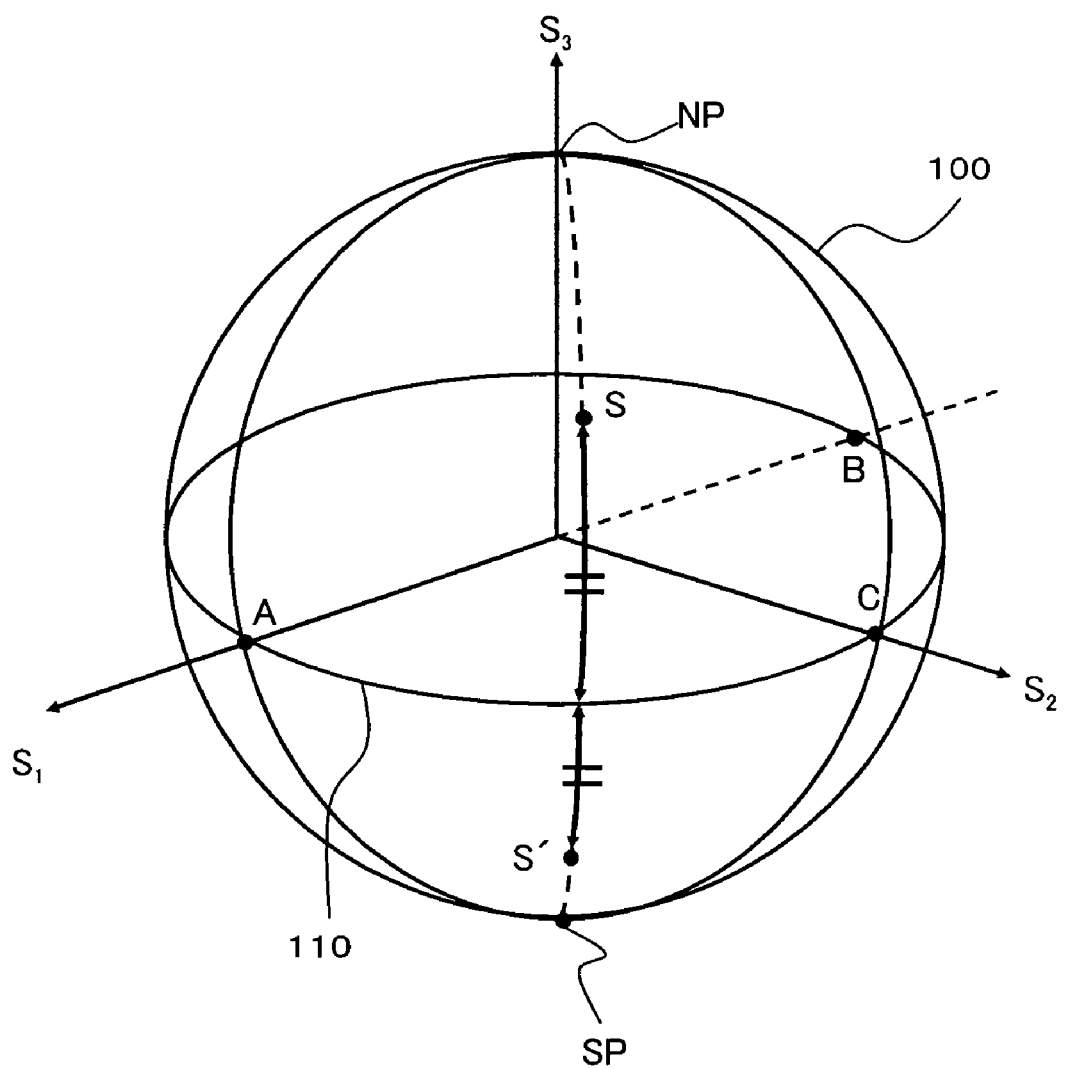
FIG. 1 is a diagram showing a Poincare sphere for explaining the principle of the present invention.
Figure 18:
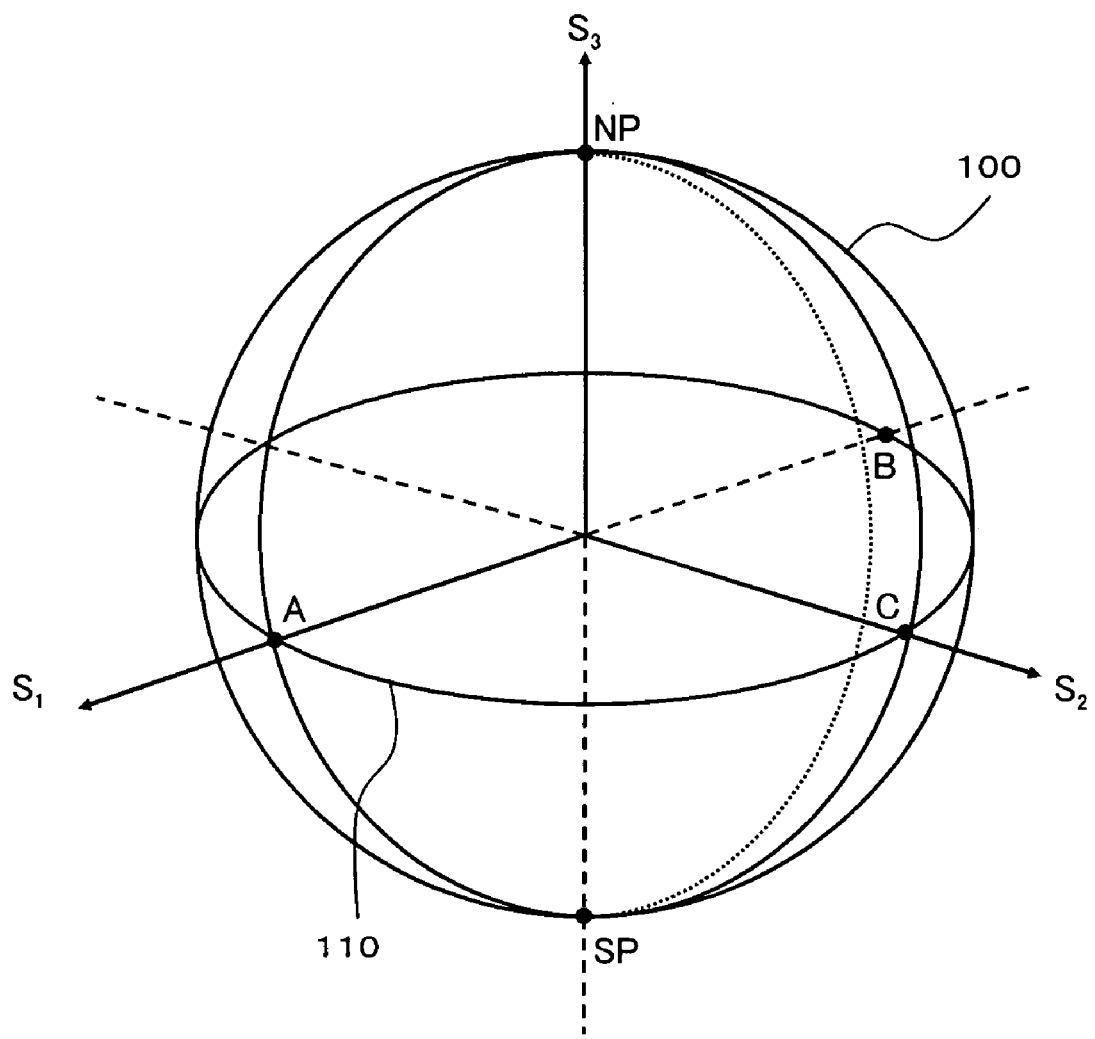
FIG. 18 is a diagram for explaining the Poincare sphere.
Figure 19:
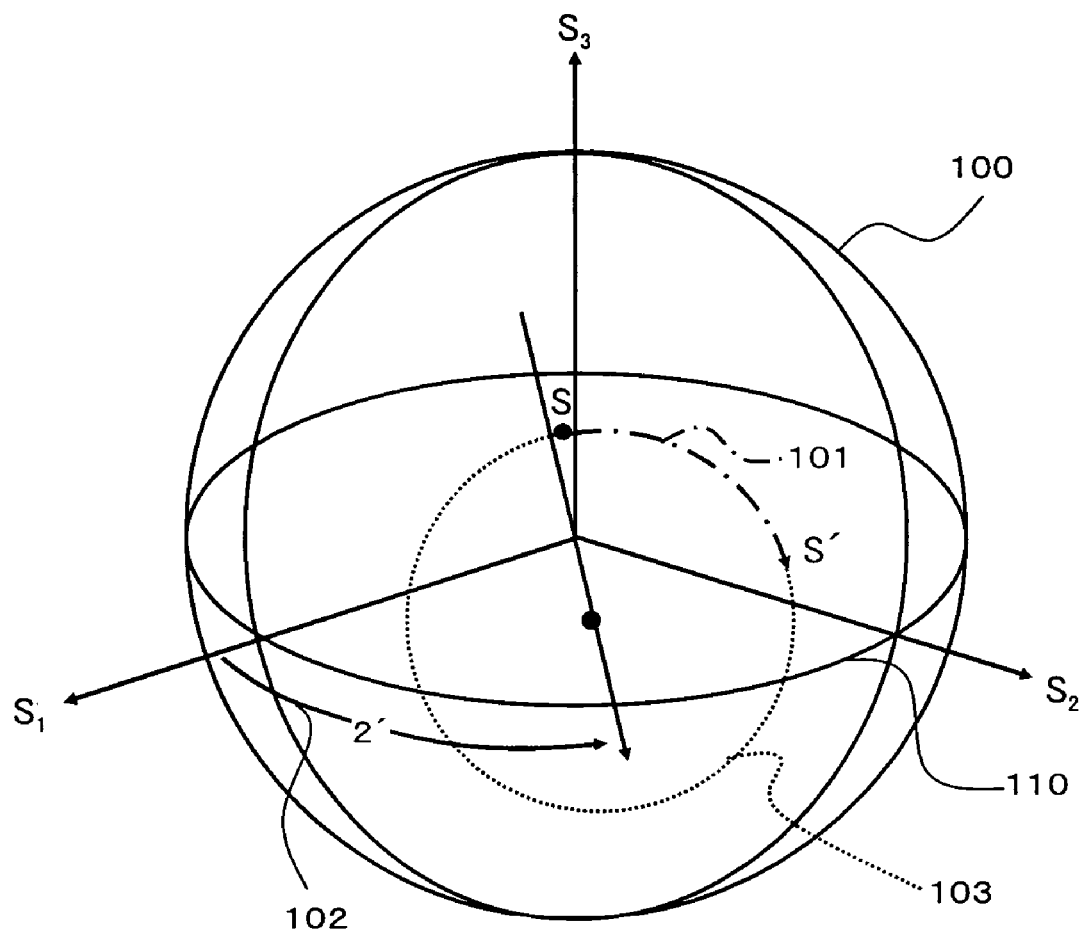
FIG. 19 is a diagram for explaining operation of a conventional polarization controller by a Poincare sphere expression.

However, a point, where the rotation axis ($S_1$ axis or $S_2$ axis) on the Poincare sphere can be rotated without changing the output polarization state, exists at a point except the point that the phase shift amount=$\lambda$. That is, as shown in FIG. 1, it is the time when the relation between the input polarization state (point S) and the output polarization state (point S') is the symmetric position relation with respect to the equator 110 of the Poincare sphere 100. In other words, it is the time when the points S and S' on the Poincare sphere expressing two polarization states are looked at the same position in case that the Poincare sphere 100 is looked from a position above the $S_3$ axis of the Poincare sphere 100. In this, also in FIG. 1, the same as those in FIG. 18, in the Poincare sphere 100, the geographical north pole NP shows clockwise circular polarization, the geographical south pole SP shows counter-clockwise circular polarization, the point A shows horizontal linear polarization (TE mode), the point B shows vertical linear polarization (TM mode), and the point C shows oblique 45° direction linear polarization. And also, polarization, except on the equator 110, the geographical north pole NP, and the geographical south pole SP, shows ellipse polarization.

When the input polarization state and the output polarization state have this relation, each of the two points S and S' expressing respective polarization states on the Poincare sphere 100 exists at an equal distance from an arbitrary point on the equator 110, therefore, in case that any point on the equator 110 is made its center, a circle passing through the two points S and S' can be drawn.

Figure 2A:
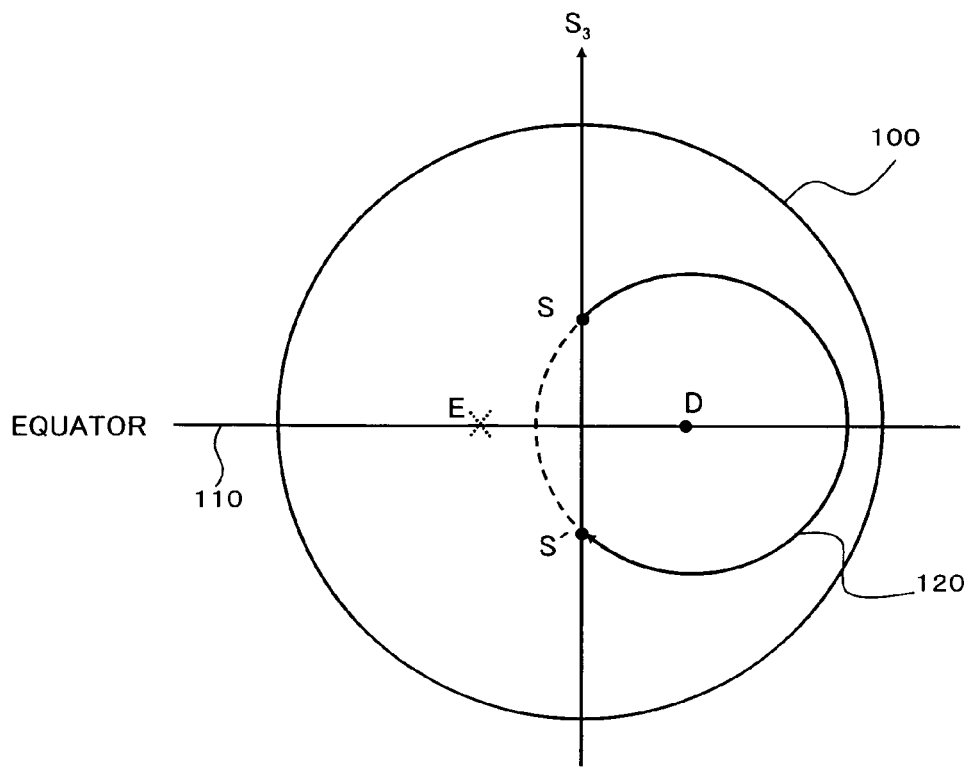
Figure 2B:
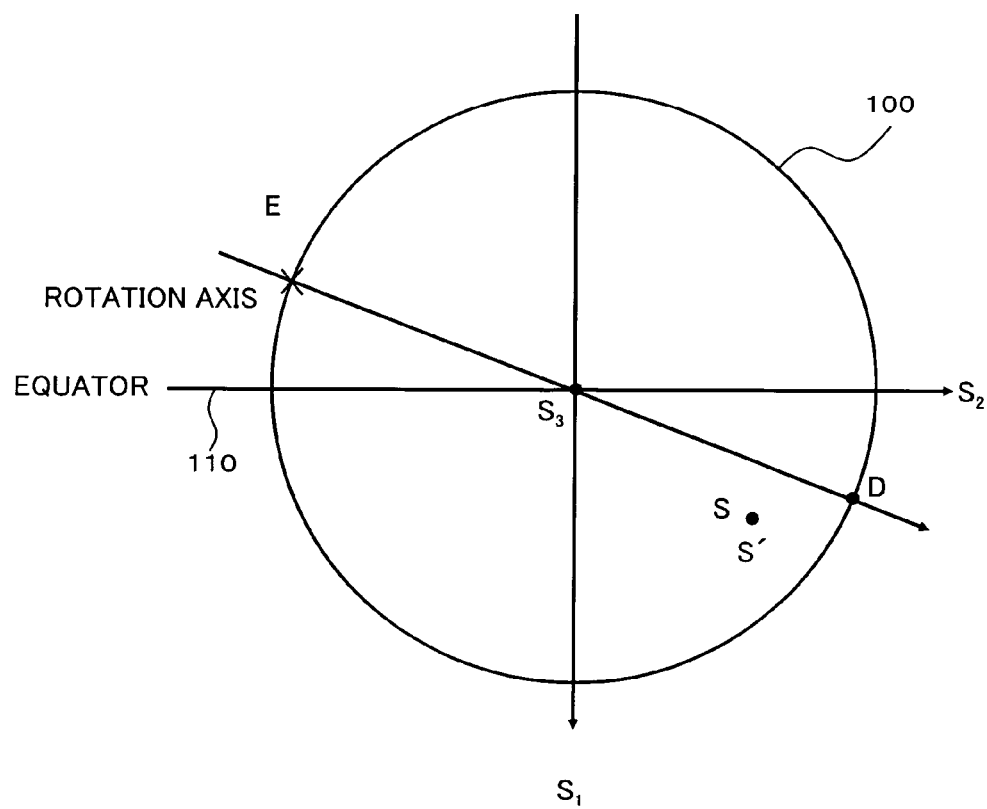

For example, as shown in FIG. 2A and FIG. 2B, when it is assumed that a straight line DE connecting a point D with a point E on the equator 110 is a rotation axis, a circle 120 passing through the two points S and S' can be drawn by making the point D (or point E) its center. Therefore, the input polarization state expressed by the point S can be changed (converted) to the output light state expressed by the point S' along the circle 120 (an arc SS'). In this, FIG. 2A is a drawing at the time when the Poincare sphere shown in FIG. 1 is looked from the side so that the points S and S' are overlapped with the axis $S_3$, and FIG. 2B is a drawing at the time when the same Poincare sphere is looked from a position above the axis $S_3$.

Figure 3A:
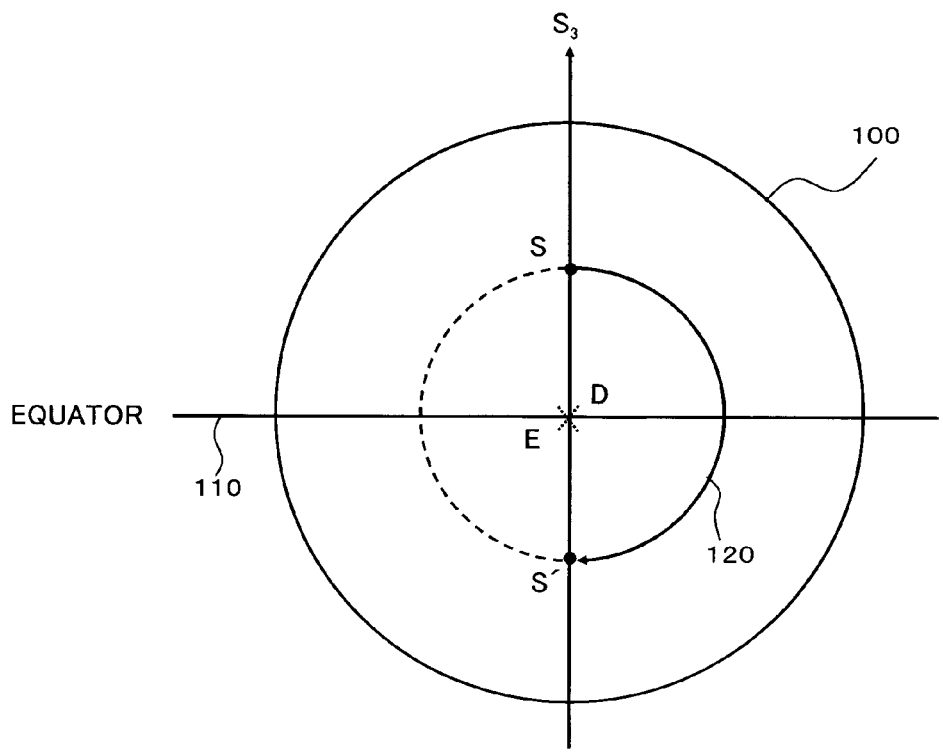
Figure 3B:
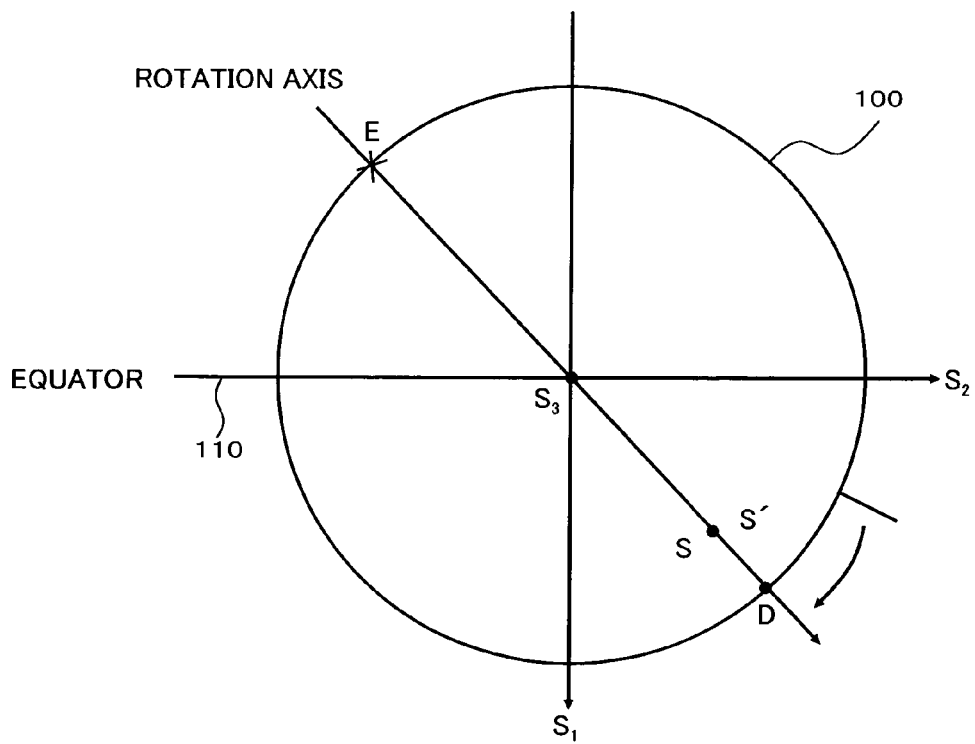
Figure 4A:
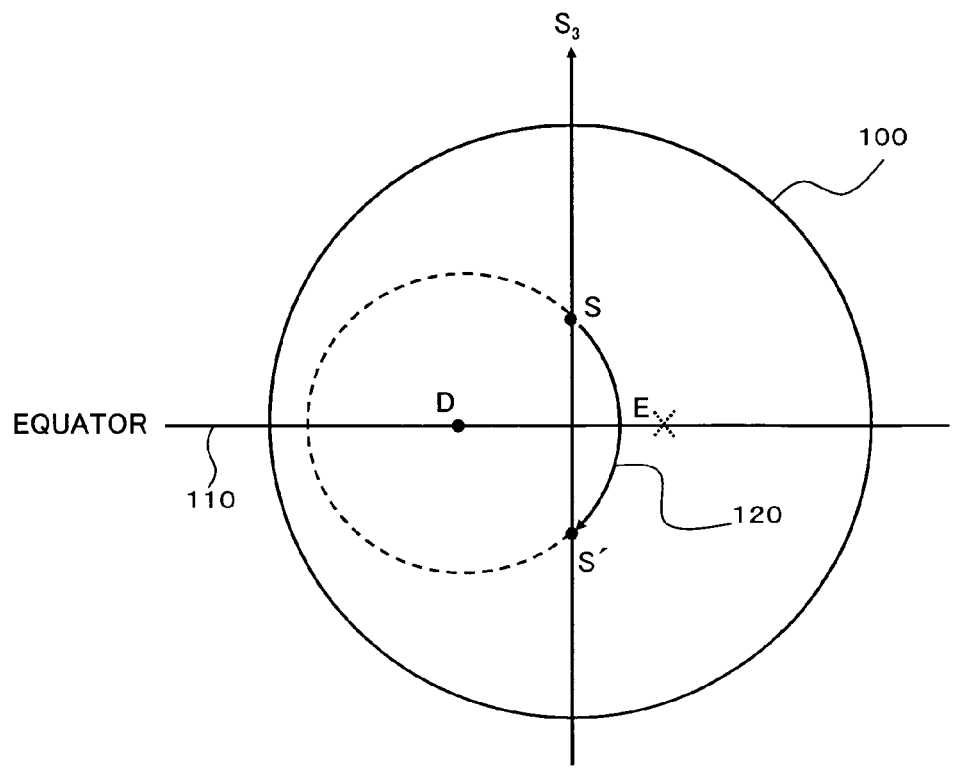
Figure 4B:
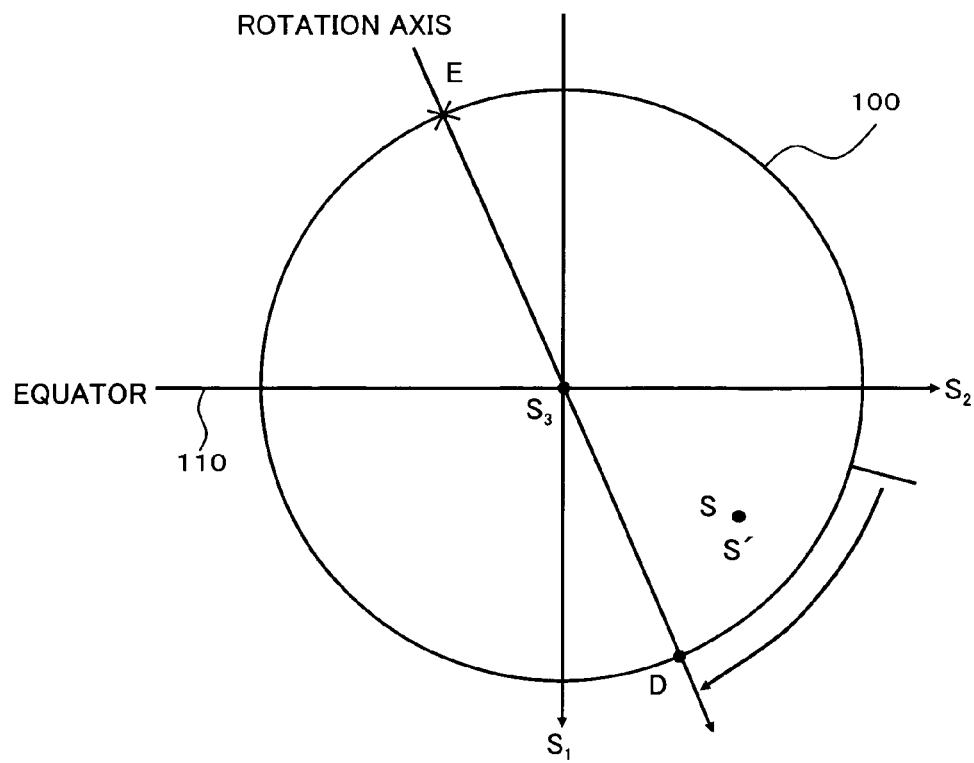
Figure 5A:
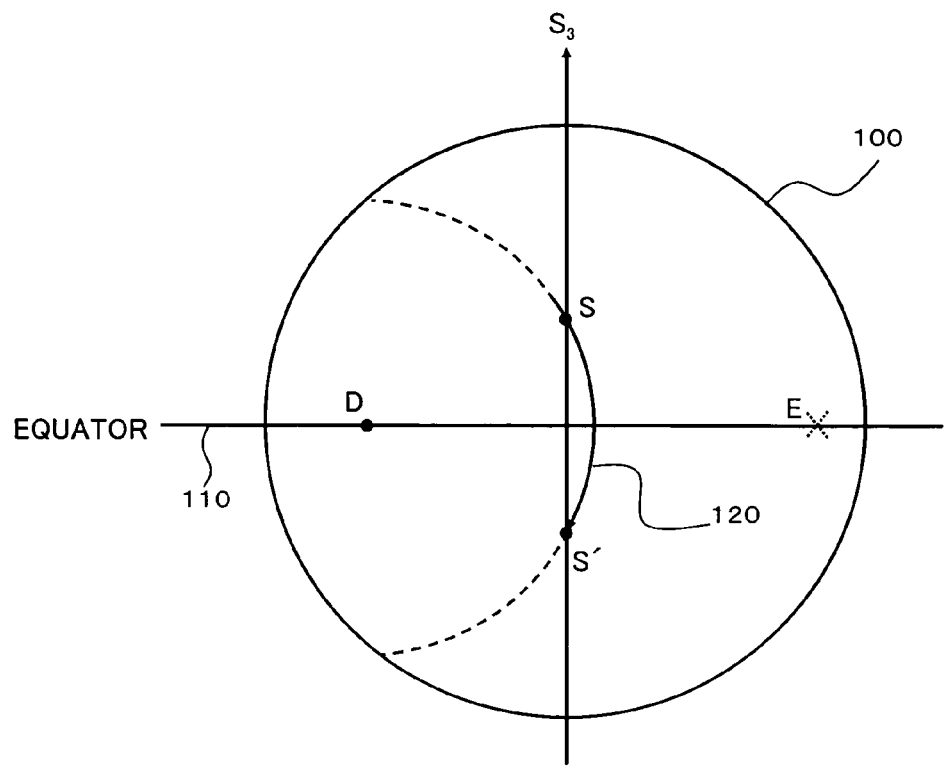
Figure 5B:
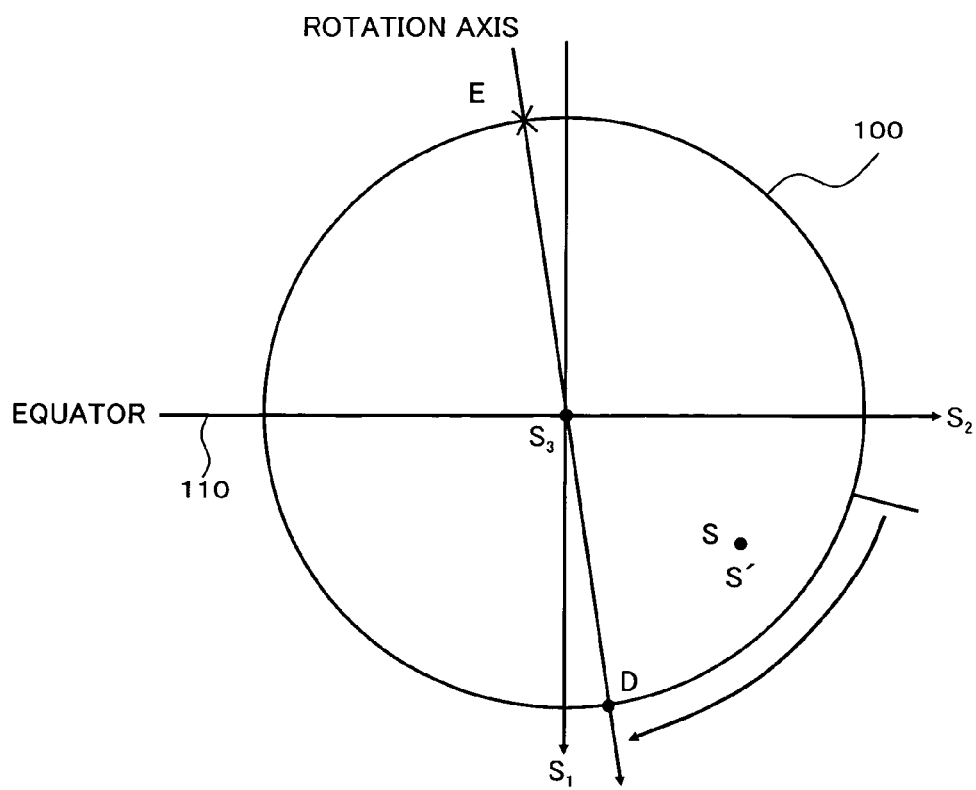
Figure 6A:
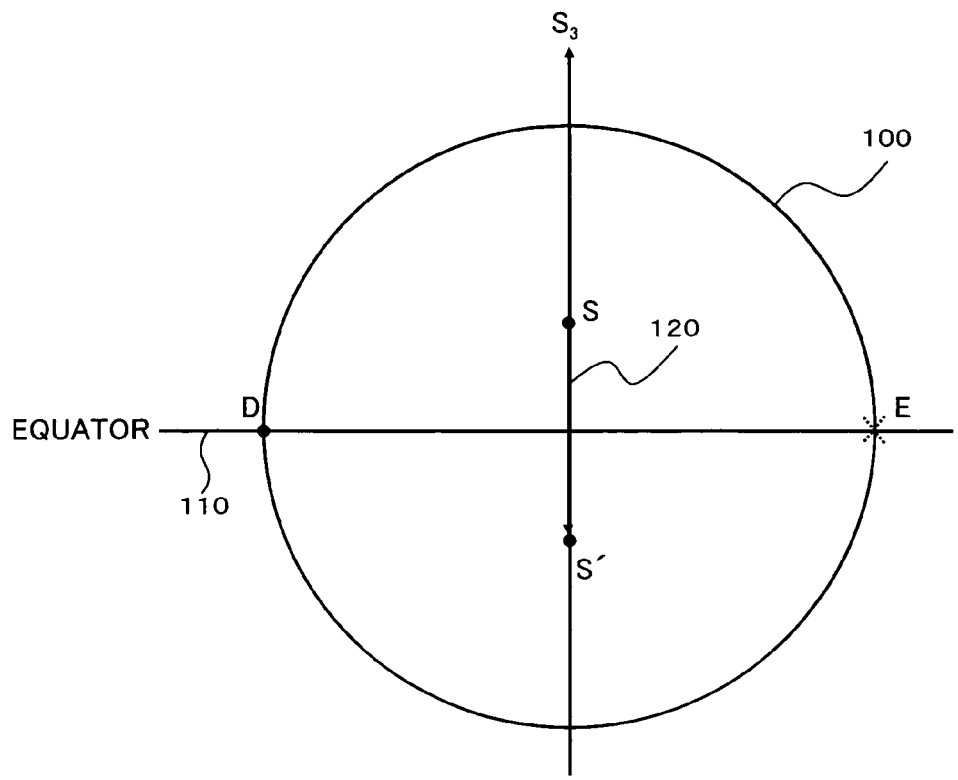
Figure 6B:
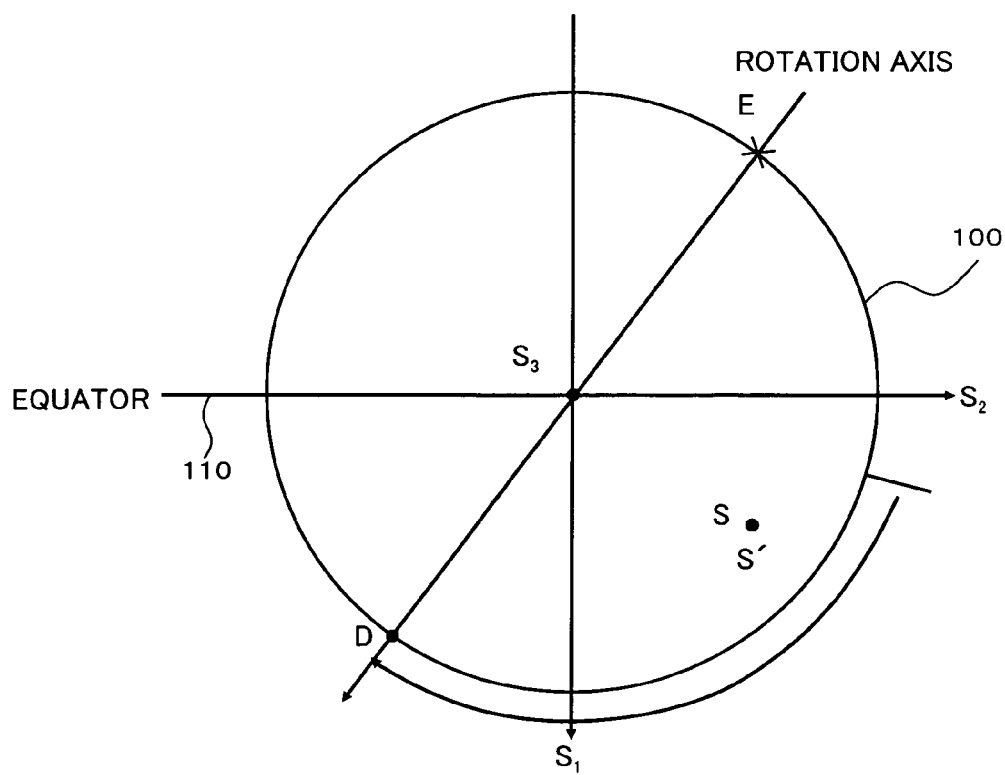
Figure 7A:
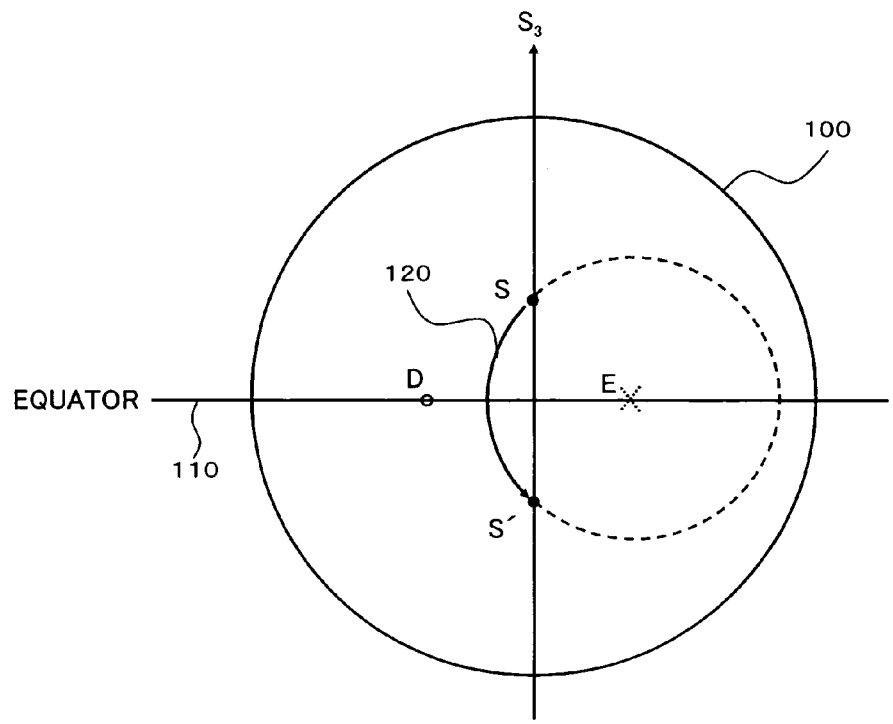
Figure 7B:
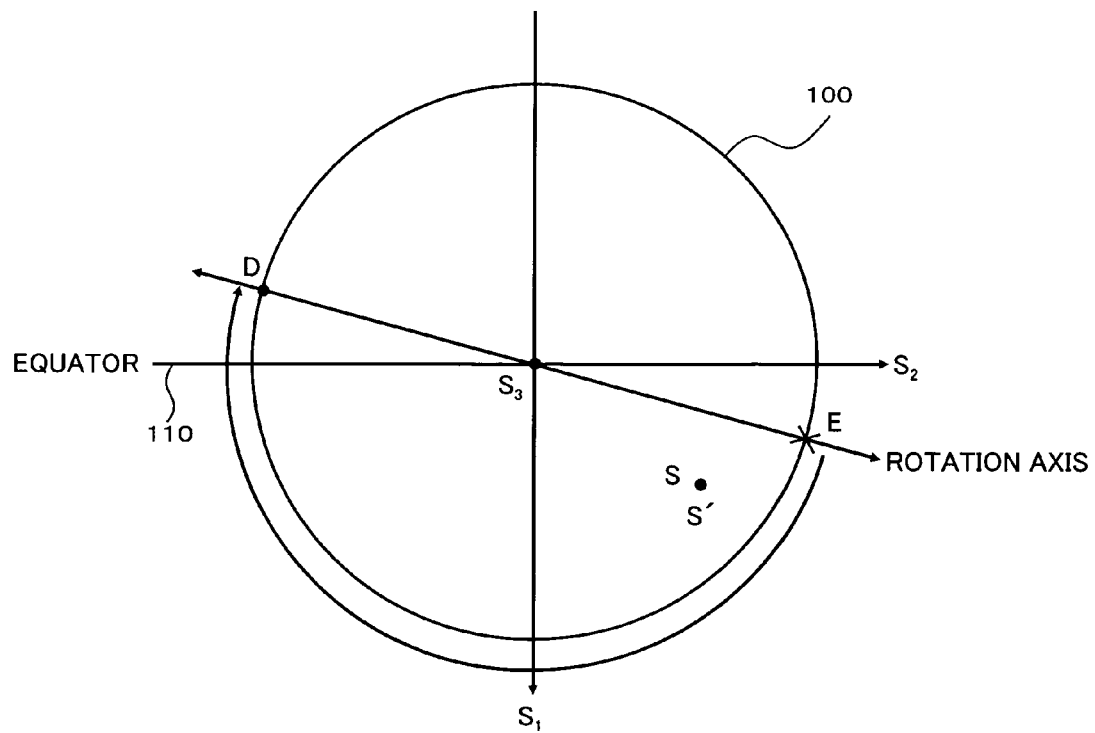

Likewise, the relation between FIG. 3A and FIG. 3B, between FIG. 4A and FIG. 4B, between FIG. 5A and FIG. 5B, between FIG. 6A and FIG. 6B, and between FIG. 7A and FIG. 7B is also the same relation between FIG. 2A and FIG. 2B, and as shown in each pair of these drawings, in case that any point D (or E) on the equator 110 is made the center, the circle 120 passing through the two points S and S' can be drawn, and the input polarization state expressed by the point S can be changed (converted) to the output polarization state expressed by the point S' along the circle 120 (the arc SS').

Therefore, the rotation axis on the Poincare sphere can be rotated by $\pi$ without changing the output polarization state. In other words, at the time when the relation between the input polarization state (point S) and the output polarization state (point S') is a symmetric position relation with respect to the equator 110 of the Poincare sphere 100, if the rotation axis on the Poincare sphere is rotated by $\pi$, the direction by which the phase shift amount is changed can be switched without changing the output polarization state, and the arbitrary and limitless control can be realized without changing the phase shift amount in the range 0 to $\lambda$.

Figure 8:
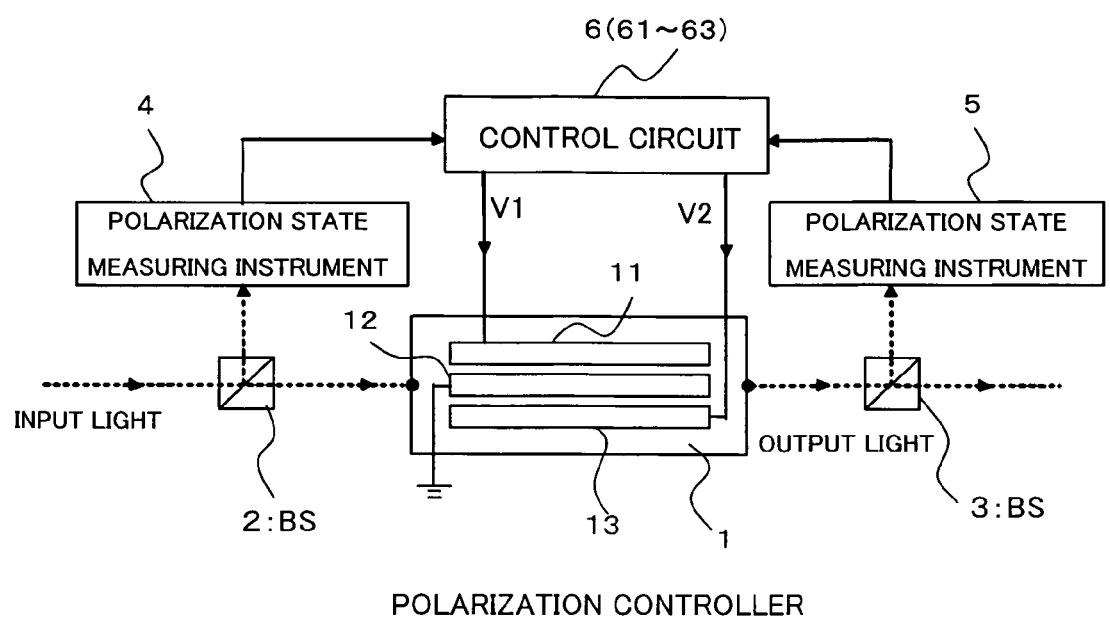
FIG. 8 is a block diagram showing a configuration of a polarization controller according to an embodiment of the present invention.

[B] Explanation of Polarization Controller According to an Embodiment of the Present Invention A polarization controller for realizing arbitrary and limitless control is explained in the following. FIG. 8 is a block diagram showing a configuration of a polarization controller according to an embodiment of the present invention, and the polarization controller shown in FIG. 8 has a configuration, in which an LN substrate 1 having electrodes 11, 12 and 13 on its surface; beam splitters (BS) 2 and 3; polarization state measuring instruments 4 and 5; and a control circuit 6 are provided.

Figure 9:
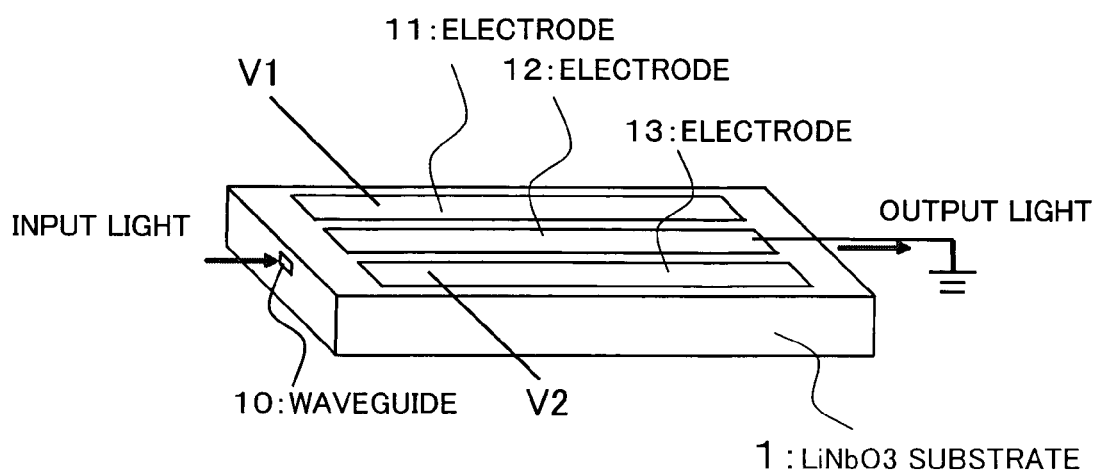
FIG. 9 is a schematic perspective view showing a configuration of an LN substrate shown in FIG. 8.

In this, the LN substrate (variable polarization light element) 1, for example, as schematically shown in FIG. 9, has a configuration, in which a waveguide 10 for transmitting input light in the z axis direction (z transmission) is provided in a substrate made of x-cut (cut in parallel to the x axis of the crystal axis) lithium niobate [LN(LiNbO$_3$)] crystals (birefringence material), and voltages V1 and V2 expressed by the following equations (1) and (2) are applied to the electrodes (hot electrodes) 11 and 13 respectively from the control circuit 6. In this, the electrode 12 is a ground electrode.

$$V1=(V_0/a)\sin+V_{0-\lambda}\cos+V_T/2 \quad (1)$$

$$V2=(V_0/a)\sin-V_{0-\lambda}\cos-V_T/2 \quad (2)$$

In this, in these equations (1) and (2), the $V_0$ shows a voltage which executes complete TE/TM conversion, and "a" is a variable depending on the phase shift amount. And the $V_{0-\lambda}$ shows a voltage for leading the phase shift in the range $0-\lambda$, and the $V_T$ shows a fixed bias voltage for compensating birefringence remaining in the waveguide 10. The shows the azimuth of the optical axis of the LN substrate 1 (hereinafter, simply referred to as "an element 1").

By applying the above-mentioned voltages V1 and V2, the phase shift amount of the element 1 and the azimuth of the element 1 are changed, and the polarization state of input light transmitting through the waveguide 10 can be changed, with this, a polarization controller of one stage structure can be realized.

The beam splitter 2 at the input side splits input light and outputs a part of the input light to the polarization state measuring instrument 4 as input monitoring light, and the remaining input light is led to the waveguide 10 in the element 1. The beam splitter 3 at the output side splits output light from the element 1 and outputs a part of the output light to the polarization state measuring instrument 5 as output monitoring light.

The polarization state measuring instrument (input light measuring instrument) 4 at the input side measures (monitors) the polarization state (input polarization state) of the input monitoring light inputted from the beam splitter 2, and the polarization state measuring instrument (output light measuring instrument) 5 at the output side measures the polarization state (output polarization state) of the output monitoring light inputted from the beam splitter 3. That is, each of these measuring instruments 4 and 5 functions as a polarization state monitoring means for monitoring each of the polarization states of the input light and the output light of the element 1.

And the control circuit 6, when the positions on the Poincare sphere 100 of the input polarization state and the output polarization state measured by each of the polarization state measuring instruments 4 and 5 are at the symmetric positions (including approximately symmetric states) for the equator 110 of the Poincare sphere 100 (hereinafter, both are referred to as the symmetric positions), rotates the rotation axis on the Poincare sphere by π by changing the azimuth of the optical axis of the element 1, and also executes voltage (V1, V2) control for inverting the changing direction of the phase shift amount $V_{0-\lambda}$.

In this, the above-mentioned symmetric positions are positions at the time when the points expressing the two states on the Poincare sphere are overlapped, in case that the Poincare sphere is looked from a position above the $S_3$ axis, therefore, the absolute values of the Stokes parameters $S_1$, $S_2$ and $S_3$ of the input light become equal to the absolute values of the Stokes parameters $S_1$, $S_2$ and $S_3$ of the output light, this state occurs.

Therefore, at the polarization state measuring instrument 4 at the input side (hereinafter, in some cases, referred to as an input polarization state measuring instrument), the Stokes parameters $S_1$, $S_2$ and $S_3$ of the input light are obtained, and at the polarization state measuring instrument 5 at the output side (hereinafter, in some cases, referred to as an output polarization state measuring instrument), the Stokes parameters $S_1$, $S_2$ and $S_3$ of the output light are obtained, and at the control circuit 6, the values of each of the parameters $S_1$, $S_2$ and $S_3$ are compared, by this, the symmetric positions can be found. However, a measuring instrument (such as a Stokes analyzer) which can obtain the Stokes parameters $S_1$, $S_2$ and $S_3$ is generally expensive.

Figure 10:
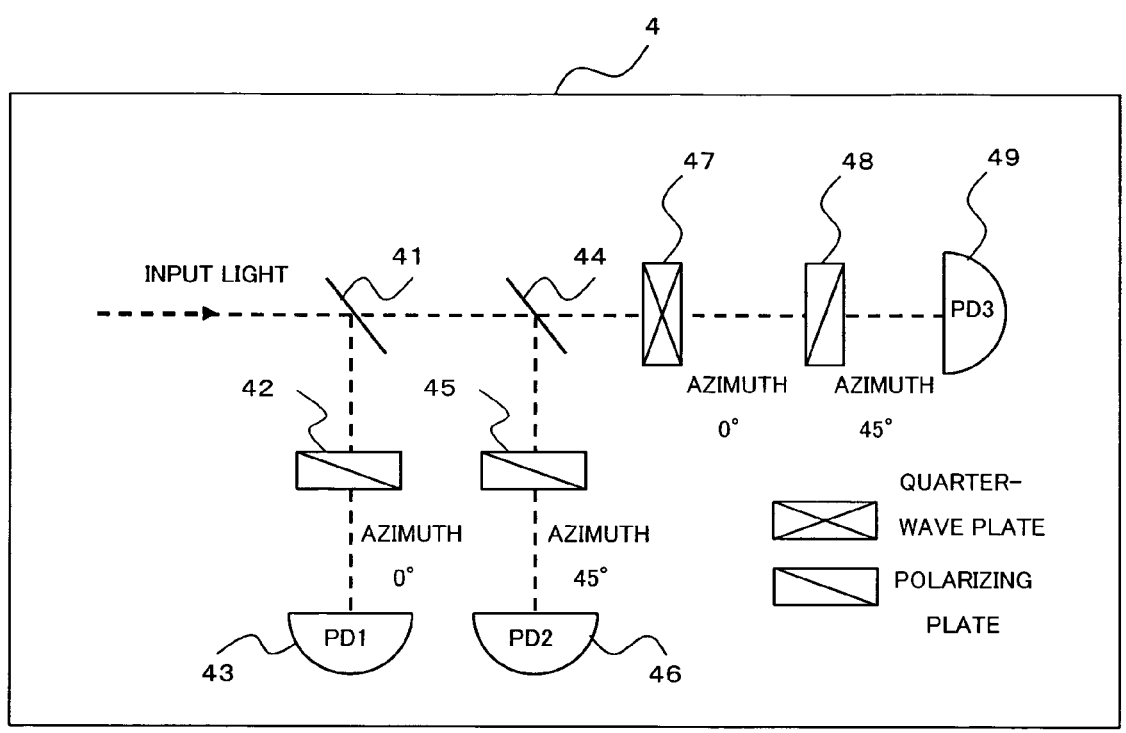
FIG. 10 is a block diagram showing a configuration of a polarization state measuring instrument (3PD measuring instrument) at the input side shown in FIG. 8.
Figure 11:
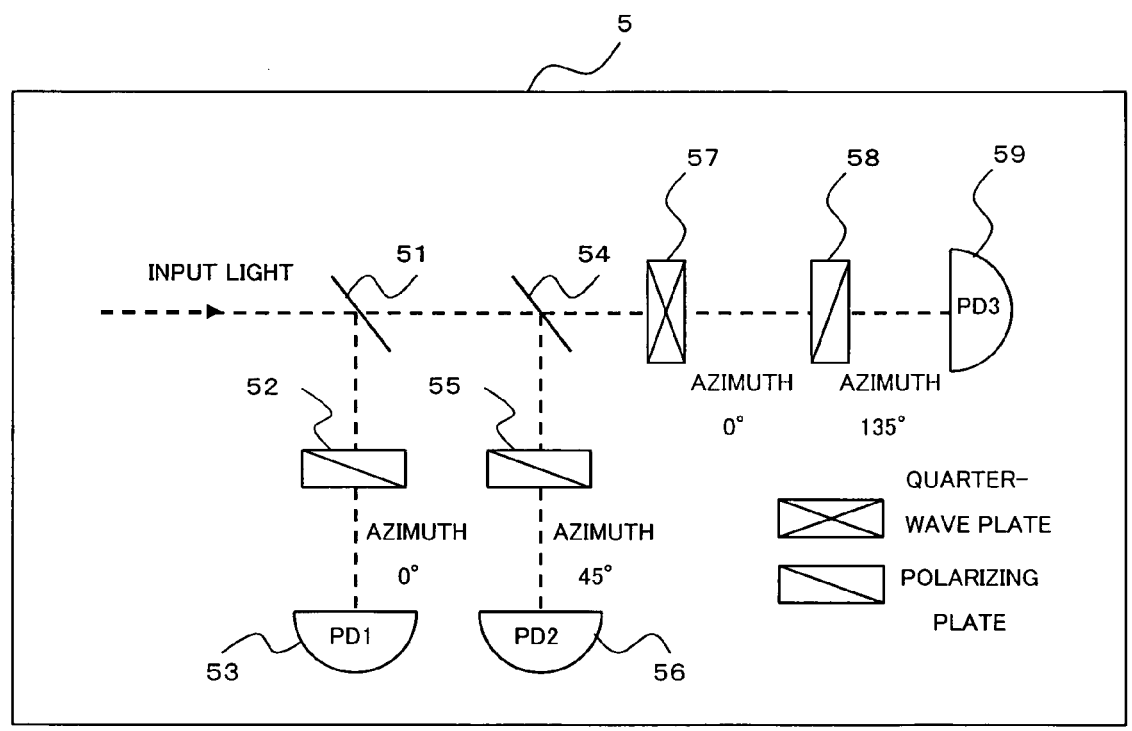
FIG. 11 is a block diagram showing a configuration of a polarization state measuring instrument (3PD measuring instrument) at the output side shown in FIG. 8.

Therefore, at the present embodiment, for example, as shown in FIG. 10 and FIG. 11, each of the polarization state measuring instruments 4 and 5 is configured in a manner that input light/output light is received at respective three photodiodes (PDs: light receiving elements) 43, 46 and 49/53, 56 and 59, and the received light amount can be measured in components separately in the three axes ($S_1$ axis, $S_2$ axis and $S_3$ axis) directions of the Poincare sphere 100, and at the control circuit 6, the symmetric positions are found from the relation of the received light amounts. In this, the measuring instruments 4 and 5 which measure the polarization state by using three PDs may be described as the 3PD measuring instruments 4 and 5.

More in detail, the input polarization state measuring instrument 4, as shown in FIG. 10, has a configuration, in which in addition to the PDs 43, 46 and 49 (hereinafter, in some cases, referred to as input PDs), beam splitters 41 and 44, polarizing plates 42, 45 and 48 (a first, a second and a third input light polarizing plates), and a quarter-wave plate 47 (a first quarter-wave plate) are provided, and a part of the input light is split at the beam splitter 41, and the split light is received at the PD 43 (a first input light receiving element) via the polarizing plate 42 whose azimuth of the optical axis is 0°. Also, a part of the same input light is split at the beam splitter 44, and the split light is received at the PD 46 (a second input light receiving element) via the polarizing plate 45 whose azimuth of the optical axis is 45°. Further, the input light passing through the beam splitters 41 and 44 is received at the PD 49 (a third input light receiving element) via the quarter-wave plate 47 whose azimuth of the optical axis is 0° and the polarizing plate 48 whose azimuth of the optical axis is 45°. In this, generally, a quarter-wave plate whose azimuth of the optical axis is 0° (90°) has functions to convert clockwise circular polarization into oblique 45° linear polarization, and also convert counter-clockwise circular polarization into oblique 135° linear polarization respectively.

By this, at the input PD 43, a TE component ($S_1$ axis component) is received. At the input PD 46, an oblique 45° linear polarization component ($S_2$ axis component) is received. At the input PD 49, a circular polarization component ($S_3$ axis component), which has passed through the polarizing plate 48 whose azimuth is 45° and converted into oblique 45° linear polarization component at the quarter-wave plate 47, is received. Finally, voltage signals corresponding to the respective received amounts are outputted tithe control circuit 6. Therefore, the received light amount at each of the PDs 43, 46 and 49 can be expressed by $S_0$ to $S_3$, and becomes as follows.

$$\text{Input PD } \mathbf{43}=(S_0\pm S_1)/2 \quad (3)$$

$$\text{Input PD } \mathbf{46}=(S_0\pm S_2)/2 \quad (4)$$

$$\text{Input PD } \mathbf{49}=(S_0\pm S_3)/2 \quad (5)$$

On the other hand, the output polarization state measuring instrument 5, as shown in FIG. 11, has a configuration, in which in addition to the above-mentioned PDs 53, 56 and 59 (hereinafter, in some cases, referred to as output PDs), beam splitters 51 and 54, polarizing plates 52, 55 and 58 (a first, a second and a third output light polarizing plates), and a quarter-wave plate 57 are provided. A part of the output light is split at the beam splitter 51, and the split light is received at the PD 53 (a first output light receiving element) via the polarizing plate 52 whose azimuth of the optical axis is 0°. Also, a part of the same output light is split at the beam splitter 54, and the split light is received at the PD 56 (a second output light receiving element) via the polarizing plate 55 whose azimuth of the optical axis is 45°. Further, the input light that has passed through the beam splitters 51 and 54 is received at the PD 59 (a third output light receiving element) via the quarter-wave plate 57 whose azimuth of the optical axis is 0° and the polarizing plate 58 whose azimuth of the optical axis is 135°.

By this, also in the output polarization state measuring instrument 5, at the output PD 53, a TE component ($S_1$ axis component) is received. At the output PD 56, an oblique 45° linear polarization component ($S_2$ axis component) is received. At the output PD 59, however, a circular polarization component ($S_3$ axis component: but a component having the inverse sign from at the input PD 49), which has passed through the polarizing plate 58 whose azimuth is 135° being different from that of the polarizing plate 48 by 90° and converted into oblique 45° linear polarization component at the quarter-wave plate 57 whose azimuth is the same as the quarter-wave plate 47, is received. Finally, voltage signals corresponding to the respective received amounts are outputted to the control circuit 6. Therefore, the received light amount at each of the PDs 53, 56 and 59 can also be expressed by $S_0$ to $S_3$, and becomes as follows.

$$\text{Output PD } 53 = (S_0 \pm S_1)/2 \quad (6)$$

$$\text{Output PD } 56 = (S_0 \pm S_2)/2 \quad (7)$$

$$\text{Output PD } 59 = (S_0 \mp S_3)/2 \quad (8)$$

As it is understandable from the above-mentioned equations (3) to (8), the input PD 43 and the output PD 53 are in the corresponding relation of normal double sign, the input PD 46 and the output PD 56 are in the corresponding relation of normal double sign, and the input PD 49 and the output PD 59 are in the corresponding relation of inverse double sign. When the relation between the input polarization state and the output polarization state is symmetric with respect to the equator 110 of the Poincare sphere 100 (refer to FIG. 1), the relation of the Stokes parameters between these two polarization states is in that the sizes and the signs of the $S_1$ and $S_2$ are the same and the size of the $S_3$ is the same but the sign of the $S_3$ is inverse. Therefore, when the values of the input PD 43 and the output PD 53, the values of the input PD 46 and the output PD 56, the values of the input PD 49 and the output PD 59 are the same as each other, it is enough for the control circuit 6 to execute switching control in which the rotation axis on the Poincare sphere 100 is rotated by only π.

That is, the control circuit 6 functions as a symmetric position detecting section 61 (refer to FIG. 8) for detecting that the input polarization state and the output polarization state are at the symmetric positions for the equator 110 of the Poincare sphere 100. The control circuit 6 functions by detecting that the received light amount measured by the input polarization state measuring instrument 4 and the received light amount measured by the output polarization state measuring instrument 5 became equal (approximately equal) in each of the three axes components of the Poincare sphere.

And in the present example, by disposing that the azimuths of the quarter-wave plates 47 and 57 to be the same as each other in each of the measuring instruments 4 and 5, and the azimuths of the polarizing plates 48 and 58 to be different from each other by 90° in each of the measuring instruments 4 and 5, at the PDs 49 and 59, the circular polarization components are received on the consideration of the relation of inverse double sign with respect to the above-mentioned $S_3$ axis components. Therefore, at the control circuit 6, the symmetric positions can be found by only comparing the respective sizes simply.

In this, the light splitting ratio to the three PDs 43, 46 and 49 or the three PDs 53, 56 and 59 is not related. It is enough that the same size light is inputted to each combination of the PDs 43, 46 and 49 or the three PDs 53, 56 and 59. Combinations (combinations of azimuths of optical axes) equivalent to the above-mentioned combination of the polarizing plates 42 (52), the polarizing plates 45 (55), the quarter-wave plates 47 (57), and the polarizing plates 48 (58) are shown in Table 1 and Table 2 below. The first combination in the Table 1 and the Table 2 below is the combination shown in FIG. 10 and FIG. 11. When any combination is applied, similar to the above-mentioned combination, the symmetric positions can be found from the relation of the received light amounts of the PDs without obtaining the Stokes parameters.

TABLE 1

| | Polarizing Plate 42 (52) | Polarizing Plate 45 (55) |
|---|---|---|
| 1 | 0° | 45° |
| 2 | 90° | 135° |

TABLE 2

| | Quarter-wave Plate 47 | Quarter-wave Plate 57 | Polarizing Plate 48 | Polarizing Plate 58 |
|---|---|---|---|---|
| 1 | 0° | 0° | 45° | 135° |
| 2 | 0° | 0° | 135° | 45° |
| 3 | 90° | 90° | 45° | 135° |
| 4 | 90° | 90° | 135° | 45° |
| 5 | 0° | 90° | 45° | 45° |
| 6 | 90° | 0° | 45° | 45° |
| 7 | 0° | 90° | 135° | 135° |
| 8 | 90° | 0° | 135° | 135° |

That is, at the output polarization state measuring instrument 5, the quarter-wave plate 57 is disposed in a manner that the azimuth of the optical axis thereof is the same with or different by 90° from the quarter-wave plate 47 in the input polarization state measuring instrument 4. The polarizing plate 58 is disposed in a manner that the azimuth of the optical axis thereof is different by 90° from the polarizing plate 48 in the input polarization state measuring instrument 4, if the azimuths of the optical axes of the quarter-wave plate 57 and the quarter-wave plate 47 in the input polarization state measuring instrument 4 are the same. If the azimuths of the optical axes are different by 90°, the polarizing plate 58 is disposed in a manner that the azimuth of the optical axis thereof becomes the same with the polarizing plate 48.

By using such an arrangement at the input PD 49 and the output PD 59, in any case, the circular polarization components are received on the consideration of inverse double sign relation with respect to the above-mentioned $S_3$ axis components. Therefore, at the control circuit 6, as mentioned above, it is enough that the simple size comparison is executed. However, at the control circuit 6, if the above-mentioned inverse double sign relation were converted by a software process and the like, the combinations (combinations of azimuths of optical axes) of the polarizing plates 42 and 52, the polarizing plates 45 and 55, the quarter-wave plates 47 and 57, and the polarizing plates 48 and 58 in the measuring instruments 4 and 5 would not be limited to those in the Table 1 and Table 2. It is enough that each of the measuring instruments 4 and 5 independently executes the detection of the three axes components of the Poincare sphere 100.

By the configuration mentioned above, at the polarization controller of the present embodiment, the polarization state of the output light is monitored by the output polarization state measuring instrument 5. The control circuit 6 executes arbitrary control by controlling the azimuth of the optical axis and the phase shift amount so that a desirable polarization state is obtained. In addition, the control circuit 6, based on the measured result by each of the measuring instruments 4 and 5, checks whether the polarization states of the input light and the output light are at the symmetric positions for the equator 110 of the Poincare sphere 100. In this case, since both of the polarization states of the input light and the output light are observed, there is no problem even if drift exists in the element 1.

If the observed two polarization states are at the symmetric positions for the equator 110 of the Poincare sphere 100 while the polarization state of the output light is being monitored by the output polarization state measuring instrument 5, the phase shift amount is adjusted in order not to change the polarization state. Also, the switching control for rotating the rotation axis on the Poincare sphere by $\pi$ is executed.

By this, as mentioned in FIGS. 2A and 2B to FIGS. 7A and 7B, at the polarization controller of one stage structure, while the relation in which the input and output polarization states are at the symmetric positions is being kept, that is, without changing the output polarization state, the changing direction of the phase shift voltage $V_{0-\lambda}$ can be switched. Therefore arbitrary and limitless control can be realized by the phase shift amount being less than $\lambda$. Consequently, by a compact configuration as a whole, the variable voltage range required by the arbitrary and limitless control can be saved compared with the conventional one, and the power consumption can be reduced.

Further, since the polarization states of the input light and the output light are measured by the 3PD measuring instruments 4 and 5, it is not necessary to obtain the Stokes parameters by using expensive instruments, and the configuration becomes simple, therefore, the polarization controller can be realized at a low cost. In this, even if existing measuring instruments are used, the arbitrary and limitless control can also be realized at the phase shift amount being less than $\lambda$.

[B1] Explanation of Modified Example

In this, as mentioned above, if the switching control, which rotates the rotation axis on the Poincare sphere 100 by $\pi$, is executed immediately, at the time when the symmetric positions (switching points) were found, right after this, the change of the phase shift amount becomes the inverse direction. In some cases, the changing range of the phase shift amount exceeds $\lambda$.

Figure 12:
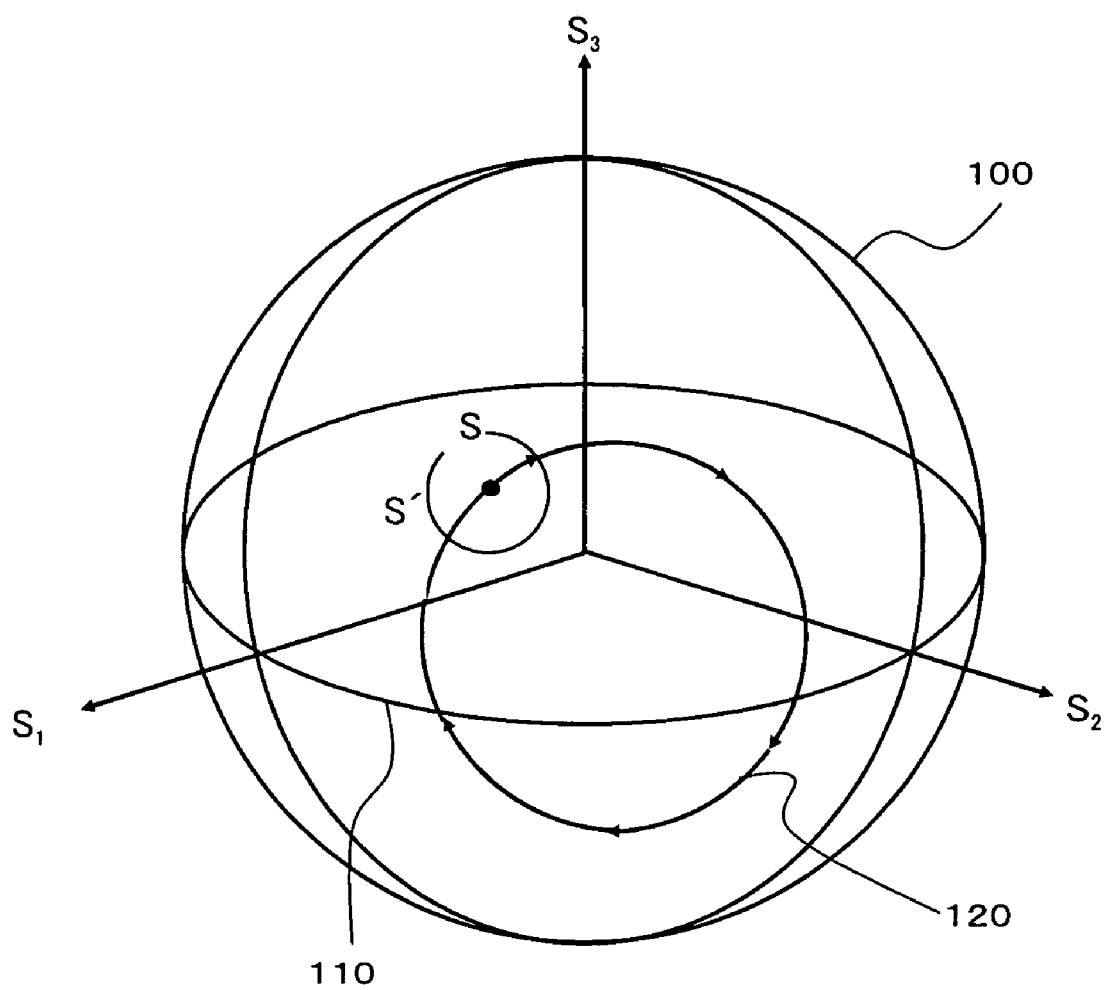
FIGS. 12 to 15 are diagrams showing a locus of a change of a polarization state on the Poincare sphere for explaining a modified example of control by a control circuit shown in FIG. 8.
Figure 13:
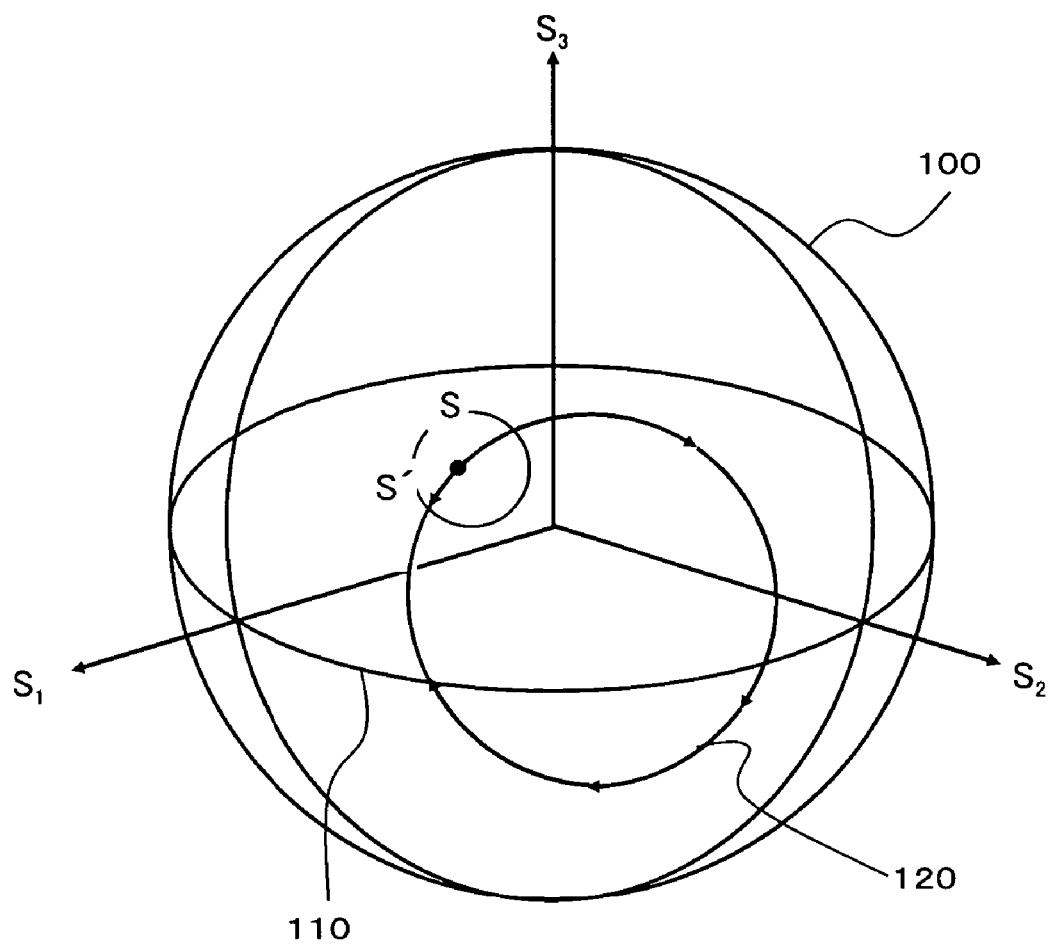
Figure 14:
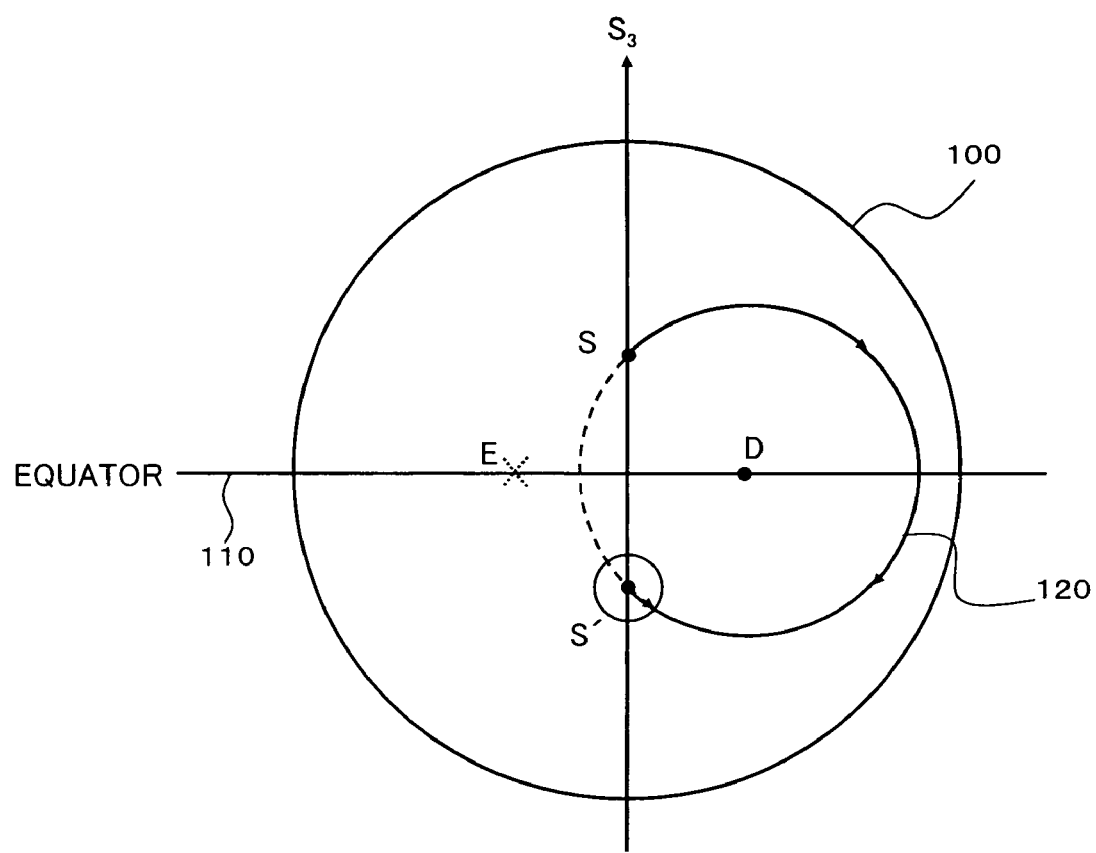
Figure 15:
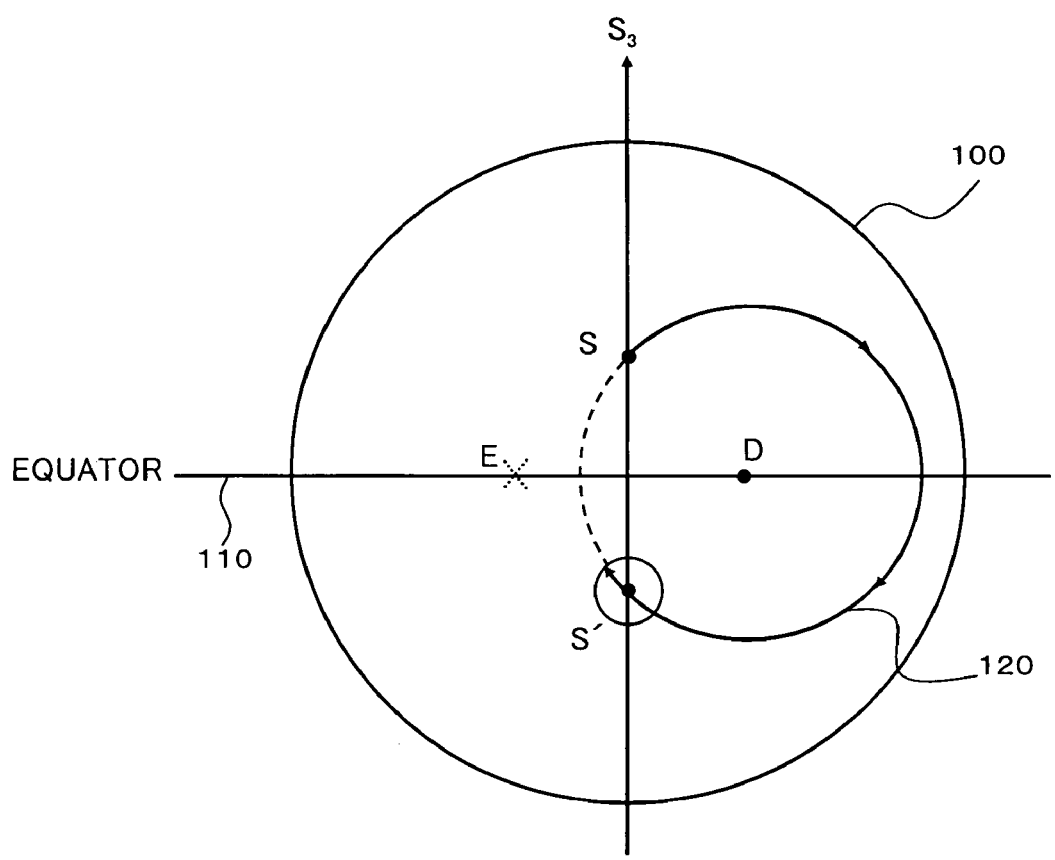

Therefore, at the control circuit 6, during the arbitrary control, a minute change of the phase shift amount after the switching points were found is observed. As shown in FIG. 12 and FIG. 14, when the changing direction of the phase shift amount after the minute change is the same as before, the switching control is executed. If, on the contrary, as shown in FIG. 13 and FIG. 15, the changing direction of the phase shift amount after the minute change is the inverse direction, the switching control is not executed.

Specifically, at the control circuit 6, the voltage (phase shift voltage) $V_{0-\lambda}$, which changes the phase shift amount, is monitored. If the switching points were found, based on the phase shift voltages $V_{0-\lambda}$ at the three states added the right before and the right after polarization states, the changing direction of the phase shift voltage $V_{0-\lambda}$ is checked to see whether it is inverted or not. If the changing direction was inverted, the switching control, which rotates the rotation axis on the Poincare sphere 100 by $\pi$, is executed. If the changing direction was not inverted, and in case that the changing direction of the phase shift voltage $V_{0-\lambda}$ became the inverse direction, the switching control is not executed.

That is, the control circuit 6 in this case has a function as a phase shift monitoring section (voltage value monitoring section) 62 (refer to FIG. 8) for monitoring the changing direction of the phase shift amount by monitoring the voltage $V_{0-\lambda}$ applying to the element 1. The control circuit 6 also has a function as an optical axis controlling section 63, which executes the rotation control of the Poincare sphere 100, if at the phase shift monitoring section 62, at least the change of the phase shift amount right after the each of the polarization states became the symmetric position was observed as the same direction with the change right before. If, on the contrary, when the inverse direction was observed, the control circuit 6 does not execute the rotation control.

By such functions of the control circuit 6, it becomes possible to prevent the changing range of the phase shift amount from exceeding $\lambda$ by that the change of the phase shift amount becomes the inverse direction right after executing the switching control at the switching points. In addition, whether the switching control is executed or not can be judged by monitoring the phase shift voltage $V_{0-\lambda}$, therefore, such control can be realized easily.

Figure 16:
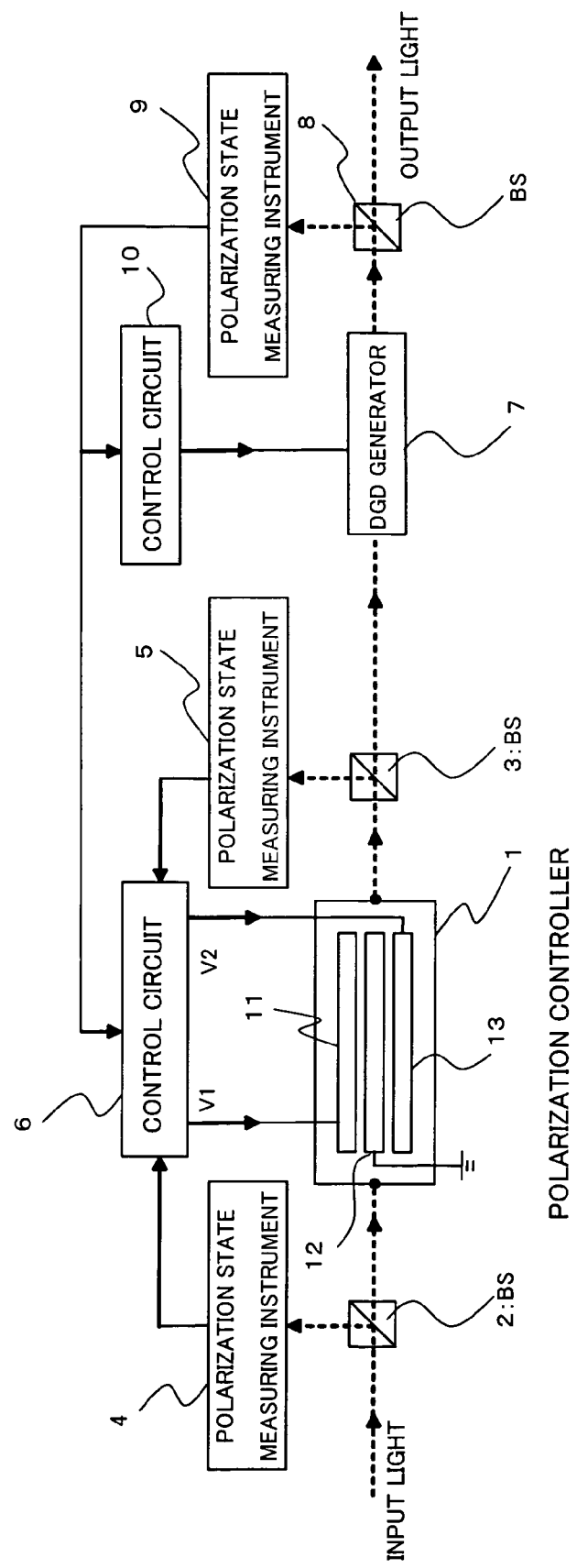
FIG. 16 is a block diagram showing a configuration of a polarization-mode dispersion compensator according to the embodiment of the present invention.

[C] Explanation of Polarization-Mode Dispersion (PMD) Compensator According an Embodiment of the Present Invention FIG. 16 is a block diagram showing a configuration of a PMD compensator according to an embodiment of the present invention. The PMD compensator shown in FIG. 16 has a configuration, using the above-mentioned arbitrary and limitless polarization controller of one stage structure [the element 1, the beam splitters 2 and 3, the polarization state measuring instruments 4 and 5, and the control circuit 6]. Further, the PMD compensator provides a differential group delay (DGD) generator 7, a beam splitter (BS) 8, a degree of polarization (DOP) measuring instrument 9, and a control circuit 10.

The DGD generator 7 receives output light from the BS 3 of the polarization controller as input light, and gives a differential group delay to the input light under the control of the control circuit 10. The BS splits the light outputted from the DGD generator 7 into two, and outputs one to the DOP measuring instrument 9 and outputs the other as output light after the PMD compensation.

The control circuit 10 controls the differential group delay given to the output light of the polarization controller at the DGD generator 7 so that the DOP measured by the DOP measuring instrument 9 becomes the maximum value (=1).

In this case, the control circuit 6 in the polarization controller also controls the azimuth and the phase shift amount of the element 1 so that the DOP becomes the maximum value based on the measured result of the DOP measuring instrument 9. The control circuit 6 executes the switching control at the switching points. At this time, the control mentioned at the item [B1] can be executed. Also, the control circuit 6 and the control circuit 10 can be common. Further, to the polarization state measuring instruments 4 and 5, the 3PD measuring instrument mentioned above in FIG. 10 and FIG. 11 can be applied, or an existing instrument can be applied.

By the above-mentioned configuration, according to the PMD compensator of the present embodiment, the arbitrary and limitless control at the polarization controller for the PMD compensation can be realized by the phase shift amount being less than λ. Compared with a case using an existing polarization controller, the power consumption of the PMD compensator can be reduced as a whole.

Figure 17:
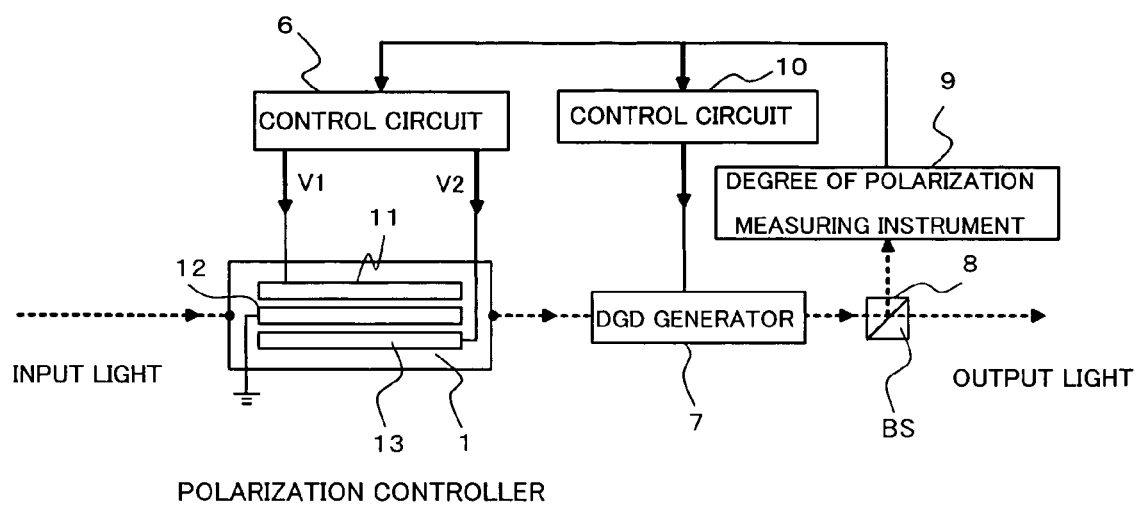
FIG. 17 is a block diagram showing another configuration of a polarization-mode dispersion compensator according to the embodiment of the present invention.

If the DOP measuring instrument 9 is used, the above-mentioned switching points in the arbitrary and limitless control can be found without using the polarization state measuring instruments 4 and 5. That is, the PMD compensator is made to have a configuration, for example, shown in FIG. 17.

After executing the control by the control circuits 6 and 10 so that the DOP to be measured at the DOP measuring instrument 9 becomes the maximum value, when the DOP is kept by that the phase shift amount of the polarization controller (the element 1) is changed by a minute amount and also the rotation axis on the Poincare sphere 100 is rotated minutely by changing the azimuth of the element 1 by a minute amount. Further, the phase shift amount is changed by a minute amount, and the rotation axis on the Poincare sphere 100 is rotated by a minute amount. When this can be repeated several times, this state becomes the switching points that can rotate the rotation axis on the Poincare sphere 100 by π, while the relation (symmetric position relation) of the input and output polarization states is being kept.

That is, the control circuit 6, when the DOP measured by the DOP measuring instrument 9 is kept (is not deteriorated), even if the minute amount change of the phase shift amount and the minute amount rotation of the azimuth of the element 1 are repeated, judges that the positions on the Poincare sphere 100 expressing each of the polarization states of the input light and the output light of the element 1 are at the symmetric positions, and executes the above-mentioned switching control.

By executing such control, the switching points are found without using the polarization state measuring instruments 4 and 5, and the switching control, in which the rotation axis on the Poincare sphere 100 is rotated by π by changing the azimuth of the element 1 at the switching points, can be executed. Therefore, in this case, the arbitrary and limitless control is realized by the phase shift amount being less than λ, and the PMD compensator can be realized in a small size and a low cost, while the reduction of the power consumption is executed.

As mentioned above, according to the present invention, when the polarization states of the input light and the output light are at the positions being symmetric or approximately symmetric for the equator of the Poincare sphere, the rotation axis with respect to the phase shift on the Poincare sphere is rotated by π, and the changing direction of the phase shift amount is inverted, with this, the arbitrary and limitless polarization control can be realized by the phase shift amount being less than λ, therefore, the reduction of the power consumption required for the arbitrary and limitless polarization control and the low cost of the polarization controller and the like can be realized, especially, it is considered that the usability of the present invention is extremely high in the optical communication technical field.

What is claimed is:

1. A polarization controller that controls a polarization state of light, comprising:
   a variable polarization light element having an optical axis, the variable polarization light element changing a polarization state of input light by changing an azimuth of the optical axis and a phase shift of the variable polarization light element;
   a polarization state monitor, the polarization state monitor monitoring the polarization state of the input light and the polarization state of output light of said variable polarization light element; and
   a controller, the controller changing the azimuth of said optical axis or inverting a changing direction of the phase shift when absolute values of Stokes parameters of the polarization state of the input light are substantially equal to absolute values of Stokes parameters of the polarization state of the output light.

2. The polarization controller according to claim 1, wherein:
   said controller is configured to repeat the changing of the azimuth of said optical axis or inverting the changing direction of the phase shift at each time that the absolute values of the Stokes parameters of the polarization state of the input light are substantially equal to the absolute values of the Stokes parameters of the polarization state of the output light.

3. The polarization controller according to claim 2, wherein:
   said polarization state monitor comprises:
      an input light measuring instrument for measuring the received light amount of said input light separately in each of compounds in the directions of three axes; and
      an output light measuring instrument for measuring the receiving light amount of said output light separately in each of components in the directions of the three axes, and
   said controller comprises:
      a symmetric position detecting section for detecting that the received light amount measured at said input light measuring instrument and the received light amount measured at said output light measuring instrument are equal or approximately equal in each of said components.

4. The polarization controller according to claim 1, wherein:
   said polarization state monitor comprises:
      an input light measuring instrument for measuring a received light amount of said input light separately in each of components in the directions of three axes; and
      an output light measuring instrument for measuring the received light amount of said output light separately in each of components in the directions of the three axes, and
   said controller comprises:
      a symmetric position detecting section for detecting that each of said absolute values of the Stokes parameters of the polarization state of the input light is substantially equal to the absolute values of the Stokes parameters of the polarization state of the output light by detecting that the received light amount measured at said input light measuring instrument and the received light amount measured at said output light measuring instrument are equal or approximately equal in each of said components.

5. The polarization controller according to claim 4, wherein:
   said input light measuring instrument comprises:
      a first input light receiving element for receiving said input light via a first input light polarizing plate;
      a second input light receiving element for receiving said input light via a second input light polarizing plate whose azimuth of the optical axis is different from an azimuth of the optical axis of said first input light polarizing plate by 45°; and a third input light receiving element for receiving said input light via a first quarter-wave plate whose azimuth of the optical axis is at an angle of 0° or 90° to the azimuth of the optical axis of the variable polarization light element and a third input light polarizing plate whose azimuth of the optical axis is different from the azimuth of the optical axis of said first quarter-wave plate by 45° or 135°.

6. The polarization controller according to claim 5, wherein:
said output light measuring instrument comprises:
a first output light receiving element for receiving said output light via a first output light polarizing plate;
a second output light receiving element for receiving said output light via a second output light polarizing plate whose azimuth of an optical axis is different from an azimuth of an optical axis of said first output light polarizing plate by 45°; and
a third output light receiving element for receiving said output light via a second quarter-wave plate whose azimuth of an optical axis is at an angle of 0° to 90° to the azimuth of the optical axis of the variable polarization light element and a third output light polarizing plate whose azimuth of the optical axis is different from an azimuth of an optical axis of said second quarter-wave plate by 45° or 135°.

7. The polarization controller according to claim 4, wherein:
said output light measuring instrument comprises:
a first output light receiving element for receiving said output light via a first output light polarizing plate;
a second output light receiving element for receiving said output light via a second output light polarizing plate whose azimuth of the optical axis is different from an azimuth of the optical axis of said first output light polarizing plate by 45°; and
a third output light receiving element for receiving said output light via a second quarter-wave plate whose azimuth of the optical axis is at an angle of 0° or 90° to the azimuth of the optical axis of the variable polarization light element and a third output light polarizing plate whose azimuth of the optical axis is different from the azimuth of the optical axis of said second quarter-wave plate by 45° or 135°.

8. The polarization controller according to claim 5, wherein:
said output light measuring instrument comprises:
a first output light receiving element for receiving said output light via a first output light polarizing plate;
a second output light receiving element for receiving said output light via a second output light polarizing plate whose azimuth of the optical axis is different from an azimuth of the optical axis of said first output light polarizing plate by 45°; and
a third output light receiving element for receiving said output light via a second quarter-wave plate whose azimuth of the optical axis is equal to or different from the azimuth of the optical axis of said first quarter-wave plate by 90° and a third output light polarizing plate whose azimuth of the optical axis is different from the azimuth of the optical axis of said third input polarizing plate by 90° in the case where the azimuths of the optical axes of said second quarter-wave plate and said first quarter-wave plate are equal, and whose azimuth of the optical axis is equal to the azimuth of the optical axis of said third input light polarizing plate in the case where said azimuths of the optical axes are different from by 90°.

9. The polarization controller according to claim 1, wherein:
said controller comprises:
a phase shift monitoring section for monitoring the changing direction of said phase shift; and
an optical axis control section for changing the azimuth of said optical axis or inverting the changing direction of the phase shift only when at least the change of the phase shift right after each of the absolute values of Stokes parameters of the polarization states became substantially equal is observed as the same direction of the change right before each of the absolute values of Stokes parameters of the polarization states became substantially equal at said phase shift monitoring section.

10. The polarization controller according to claim 9, wherein:
said phase shift monitoring section is configured as a voltage value monitoring section for monitoring the change of the voltage value which changes said phase shift applied to said variable polarization light element.

11. A polarization-mode dispersion compensator, comprising:
a variable polarization light element having an optical axis and a phase shift, the variable polarization light element changing a polarization state of light input to the variable polarization light element by changing an azimuth of the optical axis or the phase shift;
a polarization controller, the polarization controller compensating for polarization-mode dispersion of the input light by changing the azimuth of the optical axis or the phase shift of the variable polarization light element;
a polarization state monitor, the polarization state monitor monitoring the polarization state of the input light and a polarization state of the output light of said variable polarization light element;
a differential group delay generator for giving a differential group delay to the output light of said variable polarization light element;
a degree of polarization measuring instrument for measuring a degree of polarization of the output light of said differential group delay generator; and
a controller, the controller controlling said azimuth and said phase shift so that the degree of polarization measured at said degree of polarization measuring instrument becomes a maximum value, the controller changing the azimuth of said optical axis or inverting a changing direction of said phase shift when absolute values of Stokes parameters of the polarization state of the input light are substantially equal to absolute values of Stokes parameters of the polarization state of the output light.

12. A polarization-mode dispersion compensator comprising:
a variable polarization light element having an optical axis and a phase shift, the variable polarization light element changing a polarization state of light input to the variable polarization light element by changing an azimuth of the optical axis or the phase shift;
a polarization controller, the polarization controller compensating for polarization-mode dispersion of the input light by changing the azimuth of the optical axis or the phase shift of the variable polarization light element;

a differential group delay generator for giving a differential group delay to output light of said variable polarization light element;

a degree of polarization measuring instrument for measuring the degree of polarization of the output light of said differential group delay generator; and a controller, the controller when said degree of polarization measured by said degree of polarization measuring instrument is kept even if a minute amount change of said phase shift and a minute amount rotation of said azimuth of said variable polarization light element are repeated, the controller judging that absolute values of Stokes parameters of the polarization state of the input light are substantially equal to absolute values of Stokes parameters of the polarization state of the output light, and rotating said azimuth of said variable polarization light element or inverting a changing direction of said phase shift.

13. An polarization controlling method for controlling a polarization state of light, comprising the steps of:

providing a variable polarization light element having an optical axis, the variable polarization light element changing a polarization state of input light by changing an azimuth of the optical axis and a phase shift of the variable polarization light element;

monitoring a polarization state of the input light and a polarization state of output light of said variable polarization light element; and rotating the azimuth of said variable polarization light element or inverting the changing direction of said phase shift, when absolute values of Stokes parameters of the polarization state of the input light are substantially equal to absolute values of Stokes parameters of the polarization state of the output light.

14. The polarization controlling method according to claim 13, further comprising the step of:

repeating the rotation of the azimuth of said variable polarization light element or the inversion of the changing direction of the phase shift each time the absolute values of Stokes parameters of the polarization state of the input light are substantially equal to the absolute values of Stokes parameters of the polarization state of the output light.

15. An polarization controlling method for controlling a polarization state of light comprising the steps of:

providing a variable polarization light element having an optical axis, the variable polarization light element changing a polarization state of input light by changing an azimuth of the optical axis and a phase shift of the variable polarization light element;

measuring a degree of polarization of output light of said variable polarization light element by a degree of polarization measuring instrument; and controlling a differential group delay generator for giving a differential group delay to the output light of said variable polarization light element so that the degree of polarization measured at said degree of polarization measuring instrument becomes a maximum value, rotating the azimuth of said variable polarization light element or inverting a changing direction of said phase shift when absolute values of Stokes parameters of the polarization state of the input light are substantially equal to the absolute values of Stokes parameters of the polarization state of the output light.

16. An polarization controlling method for compensating polarization-mode dispersion, comprising the steps of:

providing a variable polarization light element having an optical axis, the variable polarization light element changing a polarization state of input light by changing an azimuth of the optical axis and a phase shift of the variable polarization light element;

measuring the degree of polarization of output light of said variable polarization light element by a degree of polarization measuring instrument; and judging that the absolute values of Stokes parameters of the polarization state of the input light are substantially equal to the absolute values of Stokes parameters of the polarization state of the output light, keeping said degree of polarization measured by said degree of polarization measuring instrument even if a minute amount change of said phase shift and a minute amount rotation of said azimuth of said variable polarization light element are repeated, and rotating said azimuth of said variable polarization light element, or inverting a changing direction of said phase shift.

* * * * *

UNITED STATES PATENT AND TRADEMARK OFFICE
CERTIFICATE OF CORRECTION

PATENT NO. : 7,443,504 B2  Page 1 of 1
APPLICATION NO. : 11/079224
DATED : October 28, 2008
INVENTOR(S) : Kyosuke Sone et al.

It is certified that error appears in the above-identified patent and that said Letters Patent is hereby corrected as shown below:

On the Title Page, Item (54) (Title), Line 1, change "ENDLESS" to --LIMITLESS--.

On the Title Page, Item (54) (Title), Line 4, change "ENDLESS" to --LIMITLESS--.

Column 1, Line 1, change "ENDLESS" to --LIMITLESS--.

Column 1, Line 4, change "ENDLESS" to --LIMITLESS--.

Column 16, Line 23, change "compounds" to --components--.

Column 16, Line 25, change "receiving" to --received--.

Column 17, Line 21, after "0°" change "to" to --or--.

Column 18, Line 55, change "compensator" to --compensator,--.

Column 19, Line 19, change "An polarization" to --A polarization--.

Column 20, Line 1, change "An polarization" to --A polarization--.

Column 20, Line 2, change "light" to --light,--.

Column 20, Line 22, change "An polarization" to --A polarization--.

Column 20, Line 41, change "element," to --element--.

Signed and Sealed this

Twentieth Day of January, 2009

JON W. DUDAS
*Director of the United States Patent and Trademark Office*